(12) United States Patent
Yonekubo et al.

(10) Patent No.: US 7,393,107 B2
(45) Date of Patent: Jul. 1, 2008

(54) REAR-TYPE PROJECTOR

(75) Inventors: Masatoshi Yonekubo, Hara-mura (JP); Daisuke Uchikawa, Chino (JP); Shunji Kamijima, Hara-mura (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/816,935

(22) Filed: Apr. 5, 2004

(65) Prior Publication Data

US 2005/0007562 A1 Jan. 13, 2005

(30) Foreign Application Priority Data

Apr. 7, 2003 (JP) ............................. 2003-102870
May 15, 2003 (JP) ............................. 2003-137527

(51) Int. Cl.
*G03B 21/26* (2006.01)
*G03B 21/22* (2006.01)
*G03B 21/28* (2006.01)
*H04N 5/65* (2006.01)

(52) U.S. Cl. ............................. 353/29; 353/78; 353/85; 353/94; 348/818

(58) Field of Classification Search ................... 353/30, 353/42, 121, 122, 29, 74–79, 85, 94; 359/196; 348/818, 819; 235/454, 472.01
See application file for complete search history.

(56) References Cited

U.S. PATENT DOCUMENTS

| | | | |
|---|---|---|---|
| 5,671,076 A | 9/1997 | Matsubara et al. | |
| 5,835,249 A | 11/1998 | Yamada et al. | |
| 6,084,622 A | 7/2000 | Sugiura et al. | ............... 347/170 |
| 6,163,348 A * | 12/2000 | Izumi et al. | .................. 348/761 |
| 6,511,186 B1 * | 1/2003 | Burstyn et al. | ................ 353/76 |
| 6,575,581 B2 * | 6/2003 | Tsurushima | ................ 353/121 |
| 6,802,451 B2 * | 10/2004 | Yavid et al. | ............ 235/472.01 |
| 6,832,724 B2 * | 12/2004 | Yavid et al. | .................. 235/454 |
| 6,910,778 B2 * | 6/2005 | Hamana et al. | ................ 353/42 |
| 7,110,153 B2 | 9/2006 | Sakai | |
| 2003/0021497 A1 | 1/2003 | Kandori et al. | |
| 2005/0007562 A1 | 1/2005 | Seki et al. | ...................... 353/98 |

FOREIGN PATENT DOCUMENTS

| | | |
|---|---|---|
| JP | A 57-60309 | 4/1982 |
| JP | A 5-19558 | 1/1993 |
| JP | A 06-059207 | 3/1994 |

(Continued)

*Primary Examiner*—Melissa Jan Koval
(74) *Attorney, Agent, or Firm*—Oliff & Berridge PLC

(57) ABSTRACT

A projector includes a laser beam source that outputs a laser beam and modulates the laser beam in a beam form based on an image signal, a scanning unit that scans the laser beam output by the laser beam source at least in one-dimensional direction, a scan driving unit that drive controls the scanning unit by a first force, a retaining unit that stops and retains the scanning unit at a predetermined position by a second force, and a light shielding unit that shields the laser beam from the scanning unit that is retained by the retaining unit. The scan driving unit releases the scanning unit retained by the retaining unit, and drives it when the first force is larger than the second force. The retaining unit stops and retains the scanning unit at the predetermined position when the second force is larger than the first force.

6 Claims, 22 Drawing Sheets

FOREIGN PATENT DOCUMENTS

| | | |
|---|---|---|
| JP | A 09-146029 | 6/1997 |
| JP | A 9-203878 | 8/1997 |
| JP | A 200-194302 | 7/2000 |
| JP | A 2001-267670 | 9/2001 |
| JP | A 2002-82304 | 3/2002 |
| JP | A 2002-082304 | 3/2002 |
| JP | A 2002-156591 | 5/2002 |
| JP | A 2002-207184 | 7/2002 |
| JP | A 2002-250887 | 9/2002 |
| JP | A 2002-372752 | 12/2002 |

\* cited by examiner

REAR-TYPE PROJECTOR

TECHNICAL FIELD

The present invention relates to a projector, more particularly, to a projector to display an image by scanning modulated laser beam.

BACKGROUND ART

A projector is an image display apparatus that displays an image by projecting light corresponding to image signals that are obtained from an image supplying device such as a computer. Conventionally, a metal halide lamp such as an extra-high pressure mercury lamp has mainly been used for a light source of the projectors. Recently, a laser projector that uses laser beam as light of the light source has been proposed. The laser beam source has a high directivity which allows effective utilization of light as compared to a lamp. Moreover, a projector having a laser beam source has a simpler structure and high color reproducibility. Moreover, an optical system of the projector can be made small by the use of a laser beam source. Therefore, the laser projector has an advantage that the projector is small and light, and provides projection images with excellent color reproducibility, compared to a conventional projector that uses a metal halide lamp.

The laser beam used in the projectors is quite powerful. Therefore, if the laser beam that stops scanning due to malfunction and the like and directly falls on the eyes of the people standing or seating nearby, it affects the eyes. In addition, when laser beam is irradiated on an object having a high absorptance for longer than a certain time, there is a risk of ignition. Particularly, there is a fear that stopping of laser beam scanning may cause burning of the screen. Therefore, it is necessary to reliably prevent problematic situation from occurring by shutting down the laser beam production instantly when the laser beam stops scanning for any reason. The technologies that produce safer laser beams have been proposed in, for example, Japanese Patent Application Laid-Open Publication Nos. 57-60309 and 2001-267670.

However, the conventional technologies require to check that scanning of the laser beam is not carried out normally, and to undergo a processing path via a control circuit before shutting down the laser beam production. The shutdown of the laser beam production is not directly performed on the laser beam source but indirectly carried out via the control circuit. When the shutdown of the laser beam production is indirectly carried out, there may be a case where avoiding occurrence of problematic situation arising from a hitch of the control circuit itself is not sufficient. It becomes a problem to be exposed to laser beam, in particular, to laser beam with high power because the laser beam has a high directivity. Furthermore, it is possible to divert a laser beam source to other applications by taking it out of the projector on purpose. However, diverting such a laser beam source to other applications raises a further problem when the laser beam source is provided with high power. The present invention is carried out to solve the above problems and has an object to provide a projector with a high level of safety that reduces exposure to laser beam by directly shutting down the laser beam production when scanning of the laser beam is not carried out normally. Another object of the present invention is to provide a projector that makes it possible to reduce a possibility of diversion of the projector to other applications.

DISCLOSURE OF THE INVENTION

According to the present invention it is possible to provide a projector comprising a laser beam source that outputs a laser beam and modulates the laser beam in a beam form based on an image signal; a scanning unit that scans the laser beam output by the laser beam source at least in one-dimensional direction; a scan driving unit that drive controls the scanning unit by a first force; a retaining unit that stops and retains the scanning unit at a predetermined position by a second force; and a light shielding unit that shields the laser beam from the scanning unit that is retained by the retaining unit, wherein the scan driving unit releases the scanning unit retained by the retaining unit and drives the scanning unit when the first force is greater than the second force, and the retaining unit stops and retains the scanning unit at the predetermined position when the second force is greater than the first force.

When the laser beam source supplies linear laser beam, a scanning unit scans the linear laser beam in the one-dimensional direction perpendicular to the linear longitudinal direction. Furthermore, when the laser beam source supplies dotted laser beam, the scanning unit scans the dotted laser beam in the two-dimensional direction.

The scanning unit carries out its scan action by the first force from the scan driving unit. Moreover, the scanning unit is stopped and retained at the predetermined position by the second force from the retaining unit. Here, each of the first force and the second force acts to counteract their respective actions. Therefore, when the first force is greater than the second force, the scanning unit is released from the retaining state and starts its scan action. When the first force is not sufficient to counteract the second force and further to carry out the scan action for any reason, that is, when the first force is insufficient or becomes 0, the scanning unit has a difficulty in carrying out its normal scan action. A state in which the scanning unit does not carry out the scan action normally means that, for example, the scan action stops completely or the scan action is not carried out with a constant periodicity and at a predetermined speed. When the first force becomes insufficient or 0, the scanning unit is stopped and retained at the predetermined position by the action of the second force from the retaining unit. At this time, the light shielding unit shields the laser beam from the scanning unit. This allows direct shutdown of the laser beam generation when the laser beam is not normally scanned. As the result, a projector with high safety can be obtained.

It is preferable that the projector further comprises a light source driving unit that drive controls the laser beam source; and a detecting unit that detects the laser beam incident on the light shielding unit, wherein the light source driving unit stops driving of the laser beam source when the detecting unit detects the laser beam. When the detecting unit detects the laser beam, the light source driving unit immediately stops supplying the laser beam from the laser beam source. Owing to this, the production of laser beam is directly shut down, and in addition to it, burning of the light shielding unit can be prevented. As the result, a projector with high safety can be obtained.

It is preferable that, in the projector, the scan driving unit includes a coil that generates a magnetic force, which is the first force, when an electric current is passed; and the retaining unit includes an elastic member that generates a bias force that is the second force. When the first force is insufficient to counteract the second force and further to carry out the scan action, or when the first force becomes 0, the scanning unit has a difficulty in carrying out its normal scan action. The second force from the elastic member that serves as the retaining unit is greater than the first force at this time. Therefore, the second force can stop and retain the scanning unit at the predetermined position. This allows direct shutdown of the laser beam production. As the result, a projector with high safety can be obtained.

It is preferable that, in the projector, the scan driving unit includes a coil that generates a magnetic force, which is the first force, when an electric current is passed; and the retaining unit includes a permanent magnet that generates a magnetic force that is the second force. When the first force is insufficient to counteract the second force and further to carry out the scan action, or when the first force becomes 0, the scanning unit has a difficulty in carrying out its normal scan action. The second force from the permanent magnet that serves as the retaining unit is greater than the first force at this time. Therefore, the second force can stop and retain the scanning unit at the predetermined position. Owing to this, the laser beam production can be shut down directly. As the result, a projector with high safety can be obtained.

According to the present invention it is possible to provide a projector comprising a laser beam source that outputs a laser beam that is modulated based on an image signal; a scanning unit that scans the beam light within a predetermined surface; a screen to which the modulated beam light is projected; a screen monitoring unit that receives light reflected from the screen; and a beam light supply stopping unit that controls the laser beam source so as to stop output of the laser beam based on an output of the screen monitoring unit.

Owing to the above, when something abnormal occurs with the screen, supplying the laser beam can be stopped. Hereinafter, the abnormalities of the screen in the present specification include, for example, damage and burning of the screen, or a pinhole pierced in the screen. When these abnormalities occur with the screen, the laser beam from the laser beam source is not diffused on the screen but is emitted out of the projector. This leads to a risk of exposure to the laser beam. On the other hand, supplying the laser beam can be stopped in the present invention when the screen has something abnormal. Hereinafter, stopping supplying the laser beam in the present specification means that stopping oscillation of the laser beam source, shielding an opening for laser beam emission from the laser beam source (in this case, the laser beam source may be oscillated), shutting down the power for the laser beam source, and the like. These lead to obtaining a projector with which exposure to the laser beam is reduced. More preferably, when something abnormal is detected on the screen, it is desirable that an alarm sounds to draw attention of an operator or observer by beeping or the like.

It is preferable that, in the projector, the screen monitoring unit includes a light source that emits invisible light; and a light receiving unit that receives invisible light reflected from the screen.

The screen refracts most laser beam from the laser beam source in the predetermined direction and allows its penetration. At this time, part of the laser beam becomes light scattered backward that is reflected to the space into which the laser beam has entered. When something abnormal occurs with the screen, the reflectivity on the abnormal portion is small, compared to that on the normal portion. For example, when there is a pinhole in the screen, the laser beam is emitted out of the projector through the pinhole. Accordingly, the intensity of the light scattered backward on the abnormal portion becomes lower. Therefore, detecting the intensity of invisible light reflected from the screen makes it possible to monitor an abnormality of the screen. As invisible light, for example, infrared rays can be used.

It is preferable that the projector further comprises a filter that allows the invisible light to pass through and absorb or reflects the laser beam that is arranged in a light path between the screen and the light receiving unit, wherein the light receiving unit receives the invisible light reflected from the screen, and the beam light supply stopping unit controls the laser beam source so as to stop output of the laser beam when an intensity of the invisible light received by the light receiving unit is lower than a predetermined value. Laser beam to form an image and invisible light from the light source for screen monitoring are irradiated on the screen. Parts of the laser beam and the invisible light are reflected backward on the screen. In the present mode, the filter that allows the invisible light to penetrate and absorbs or reflects the laser beam is further provided, which effectively leads only invisible light to the light receiving unit for screen monitoring.

It is preferable that, in the projector, the light source unit emits the invisible light as modulated light that has a predetermined pulse train; the light receiving unit for screen monitoring receives the invisible light that has the pulse train; and the beam light supply stopping unit controls the laser beam source so as to stop output of the laser beam when the pulse train of the invisible light to be received by the light receiving unit for screen monitoring is not detected. When an abnormality occurs with the screen, the reflectivity on the abnormal portion is lower as described above. Owing to this, when the invisible light is irradiated on the normal portion of the screen, a pulse train is detected by the light receiving unit for screen monitoring. On the other hand, when the invisible light is irradiated on the abnormal portion, the intensity of the pulse train is lowered at the light receiving unit for screen monitoring, or the pulse train itself is missing. Therefore, the abnormality of the screen can be monitored more accurately.

It is preferable that, in the projector, the screen monitoring unit includes a beam light receiving unit that receives the light reflected from the screen or the light propagated inside the screen from among the beam lights projected to the screen, the beam light supply stopping unit controls the laser beam source so as to stop output of the laser beam when a correlation value between the beam light projected to the screen and the light reflected from the screen, or a correlation value between the beam light projected to the screen and the light propagated inside the screen is smaller than a predetermined value.

The laser beam source projects modulated laser beam on the screen according to image signals. Use of the laser beam for image formation makes it possible to monitor the condition of the screen as well. In this case, a correlation value between the intensity of the beam light for image formation before projection to the screen and the beam light reflected from the screen is determined. When something abnormal occurs with the screen, the correlation value of the beam light reflected from the abnormal portion becomes smaller, compared to that when the screen is under the normal condition. Accordingly, calculating correlation values allows monitoring abnormality of the screen. The present mode makes it possible to monitor the screen in a simple structure without providing a light source unit for screen monitoring.

It is preferable that the projector further comprises a laser beam source that outputs a laser beam that is modulated based on an image signal; a scanning unit that scans the beam light within a predetermined surface; a screen to which the modulated beam light is projected; a scan monitoring unit that monitors scanning of the scanning unit and outputs a result of monitoring; and a beam light supply stopping unit that controls the laser beam source so as to stop output of the laser beam based on the result of monitoring output by the scan monitoring unit. For example, when the laser beam is supplied from the laser beam source in a state in which the scanning unit stops due to malfunction, the laser beam is kept on being irradiated on one portion of the screen. When a laser beam source with high power is used, there is a risk that the portion continuously irradiated may be damaged, thereby emitting the laser beam out of the projector. The present mode makes it possible to stop supplying the beam light when something abnormal takes place with the scanning unit to scan the laser beam and when scanning of the beam light is not carried out normally.

It is preferable that, in the projector, the scanning unit is a galvano-mirror whose plane mirror is rotated around a predetermined axis, and the scan monitoring unit is a galvano-mirror monitoring unit to monitor the rotation action of the galvano-mirror. Monitoring the movement of the galvano-mirror makes it possible to monitor whether the scanning of the beam light is carried out normally.

It is preferable that, in the projector, the scan monitoring unit includes a light source that emits invisible light; and a light receiving unit provided near the outer periphery of the screen and that receives the invisible light, wherein the scanning unit scans the beam lights and the invisible light. When the scanning unit does not act normally, the invisible light is also not scanned normally. Therefore, receiving the invisible light being scanned by the scanning unit allows monitoring the action of the scanning unit.

It is preferable that, in the projector, the scan monitoring unit includes a light source that emits invisible light; a reflecting member provided near the outer periphery of the screen and that reflects the invisible light; and a light receiving unit that receives the invisible light from the reflecting member. The reflection member can reflect the invisible light being scanned by the scanning unit. Receiving the reflected invisible light makes it possible to monitor the action of the scanning unit. As the reflection member, a reflecting mirror, a corner cube, or the like can be used.

According to the present invention it is possible to provide a projector comprising a laser beam source that outputs a laser beam that is modulated based on an image signal; a scanning unit that scans the beam light within a predetermined surface; a reflecting mirror that reflects the beam light scanned by the scanning unit; a screen provided opposite to the reflecting mirror and projected with the beam light reflected from the reflecting mirror; a reflecting mirror monitoring unit that monitors condition of the reflecting mirror and outputs a result of monitoring; and a beam light supply stopping unit that controls the laser beam source so as to stop output of the laser beam based on the result of monitoring output by the reflecting mirror monitoring unit. The projector can be made small by projecting the beam light on the screen via the reflecting mirror. In this case, it is possible to monitor something abnormal occurring with the reflecting mirror. Here, the abnormality of the reflecting mirror means damage, burning, pinhole or the like that occurs with the reflecting mirror. When an abnormality occurs with the reflecting mirror, supplying the laser beam is stopped. This allows a reduction in the possibility of exposure to the laser beam.

It is preferable that, in the projector, the scan monitoring unit includes a light source that emits invisible light; and a light receiving unit that receives the invisible light that is reflected by the reflecting mirror and propagated inside the screen, wherein the beam light supply stopping unit controls the laser beam source so as to stop output of the laser beam when intensities of the invisible light received by the light receiving unit are lower than a predetermined value. The screen is constituted of glass, plastic resin, or the like that enables to propagate the invisible light and guide it. The invisible light reflected from the reflecting mirror enters the screen in this case. The invisible light is refracted and penetrates through the screen to an observer side. Part of the invisible light does not penetrate through the screen but propagates inside the screen. The light to propagate inside the screen is received at the light receiving unit for monitoring of reflecting mirror. When an abnormality occurs with the reflecting mirror, the reflectivity is lowered. This leads to reduction in the intensity of the invisible light to propagate inside the screen. By detecting the invisible light that propagates inside the screen, it becomes possible to monitor the reflecting mirror.

According to the present invention it is possible to provide a projector comprising a laser beam source that outputs a laser beam that is modulated based on an image signal; a scanning unit that scans the beam light within a predetermined surface; a screen to which the modulated beam light is projected; a cabinet to house at least the laser beam source, the scanning unit, and the screen; a plurality of vibration sensors provided in the cabinet, wherein the vibration sensors output a result of detection; and a beam light supply stopping unit that controls the laser beam source so as to stop output of the laser beam based on the result of detection output by the vibration sensors. When the projector main body is damaged on purpose, or when the projector main body is damaged by an earthquake or the like, there is a risk that the laser beam is emitted directly out of the cabinet. When the projector main body is damaged intentionally, or the projector main body is damaged by an earthquake or the like, the cabinet of the projector main body vibrates with amplitude that is larger than the predetermined amplitude. Therefore, when the vibration of the cabinet is detected by the vibration sensor, supplying the laser beam is stopped, which allows a reduction in the possibility of exposure to the laser beam.

According to the present invention it is possible to provide a projector comprising a laser beam source that outputs a laser beam that is modulated based on an image signal; a scanning unit that scans the beam light within a predetermined surface; a screen to which the modulated beam light is projected; a cabinet to house at least the laser beam source, the scanning unit, and the screen; a plurality of reflecting mirrors provided in the cabinet; a light receiving unit that receives at least a light reflected from the reflecting mirrors and output a result of detection; and a beam light supply stopping unit that controls the laser beam source so as to stop output of the laser beam based on the result of detection output by the light receiving unit. The cabinet of the projector is in an enclosed structure to prevent the laser beam from being emitted outside of parts other than the screen. However, for example, an opening for maintenance such as adjustment, repair of the components inside, and the like may be provided in some cases. When the laser beam source is vibrated while the opening for maintenance is open, there is a risk that the laser beam is emitted out of the cabinet through the opening. In the present mode, for example, a plurality of reflecting mirrors are provided on the inner side surface of the cabinet at the opening for maintenance and the predetermined inner wall surface of the cabinet. The laser beam is allowed to enter the reflecting mirrors at the time of putting power on, at the regular time, or at any given time. The light receiving unit for cabinet monitoring is provided at the position that the light reflected from all the reflecting mirrors enters. Because of this, when the opening for maintenance or the like is open, the light receiving unit for cabinet monitoring does not receive the laser beam. As the result, it is possible to detect whether the cabinet is optically sealed. When the cabinet is not optically sealed, supplying the laser beam is stopped, thereby reducing the possibility of exposure to the laser beam.

It is preferable that, in the projector, the beam light supply stopping unit controls the laser beam source so as to stop output of the laser beam when the detection result indicates that an intensity of the beam light received by the light receiving unit is lower than a predetermined value. As described above, when the opening for maintenance or the like is open, the light receiving unit for cabinet monitoring does not receive the laser beam. Furthermore, when an abnormality such as damage or pinhole occurs with the inner wall surface of the cabinet, there is a risk that the laser beam is emitted outside from the abnormal portion of the inner wall surface of the cabinet. The laser beam is reflected from the predetermined portion on the inner wall of the cabinet besides a plurality of the reflecting mirrors and is received at the light receiving unit for cabinet monitoring in this case. When the intensity of the beam light received by the light receiving unit for cabinet monitoring is lower than the predetermined value, for example, it is possible to detect that the opening for maintenance is open or an abnormality is occurring with the inner wall surface of the cabinet. This allows a reduction in the possibility of exposure to the laser beam.

According to the present invention it is possible to provide a projector comprising a first color laser beam source that outputs a first color beam light that is modulated based on an image signal; a second color laser beam source that outputs a second color beam light that is modulated based on an image signal; a third color laser beam source that outputs a third color beam light that is modulated based on an image signal; a laser unit to house the first color laser beam source, the second color laser beam source, and the third color laser beam source, the laser unit having an opening; a shutter provided at the opening of the laser unit; a scanning unit that scans the beam lights within a predetermined surface; a screen to which the modulated beam lights are projected; a cabinet to house at least the laser unit, the scanning unit, and the screen; fixing units to fix the cabinet and the laser unit; and a laser beam supply stopping unit to stop supply of the laser beams when the cabinet and the laser unit get separated from each other.

It may be thought about that the laser beam source inside the projector is taken out of the projector main body intentionally and it is diverted to other applications. There is a possibility of exposure to the laser beam in this case as well. In the present mode, the laser unit in which the laser beam sources for each color are housed is fixed to the cabinet by a fixing unit. When the cabinet and the laser unit are separated from each other, that is, when the laser unit is taken out of the cabinet, supplying laser beam is stopped. This allows reduction in the possibilities of diversion of the laser beam source to other applications and exposure to the laser beam.

It is preferable that, in the projector, the laser beam supply stopping unit includes a shutter driving unit to prevent each of the color beam lights from being emitted from the opening by closing the shutter irreversibly when the cabinet unit and the laser unit get separated from each other. This allows the laser beam to be shielded by the shutter even when the laser beam remains oscillating.

It is preferable that, in the projector, the laser beam supply stopping unit makes each of the color laser beam sources unable to oscillate in an irreversible way when the cabinet unit and the laser unit get separated from each other. When the cabinet and the laser unit are separated from each other, each color laser beam source is made unable to oscillate in an irreversibly way. Thus, even if the laser unit is reinstalled in the cabinet, it is not possible for the laser beam to be oscillated. As the result, the laser unit cannot be oscillated independently. Furthermore, even if the laser unit is installed in another appropriate cabinet, the laser unit cannot be oscillated. This allows further reliable reduction in the possibilities of diversion of the laser unit to other applications and exposure to the laser beam.

It is preferable that, in the projector, the laser unit includes a first circuit substrate that has first recognition data; and a controller that drives each of the color laser beam sources, the cabinet includes a second circuit substrate that has second recognition data, wherein the second circuit substrate is arranged outside of the laser unit, and the controller drives each of the color laser beam sources only when the first recognition data and the second recognition data are the same. Accordingly, unless the laser unit and the cabinet both having the predetermined identifying numbers are combined, the laser beam source cannot oscillate laser beam. As the result, the laser unit cannot be oscillated independently. Furthermore, the laser unit cannot be oscillated even if it is installed in another appropriate cabinet. This allows a reliable reduction in the possibility of exposure to the laser beam.

BEST MODE FOR CARRYING OUT THE INVENTION

Exemplary embodiments of the present invention will be explained in detail below while referring to the accompanying drawings.

Figure 1:
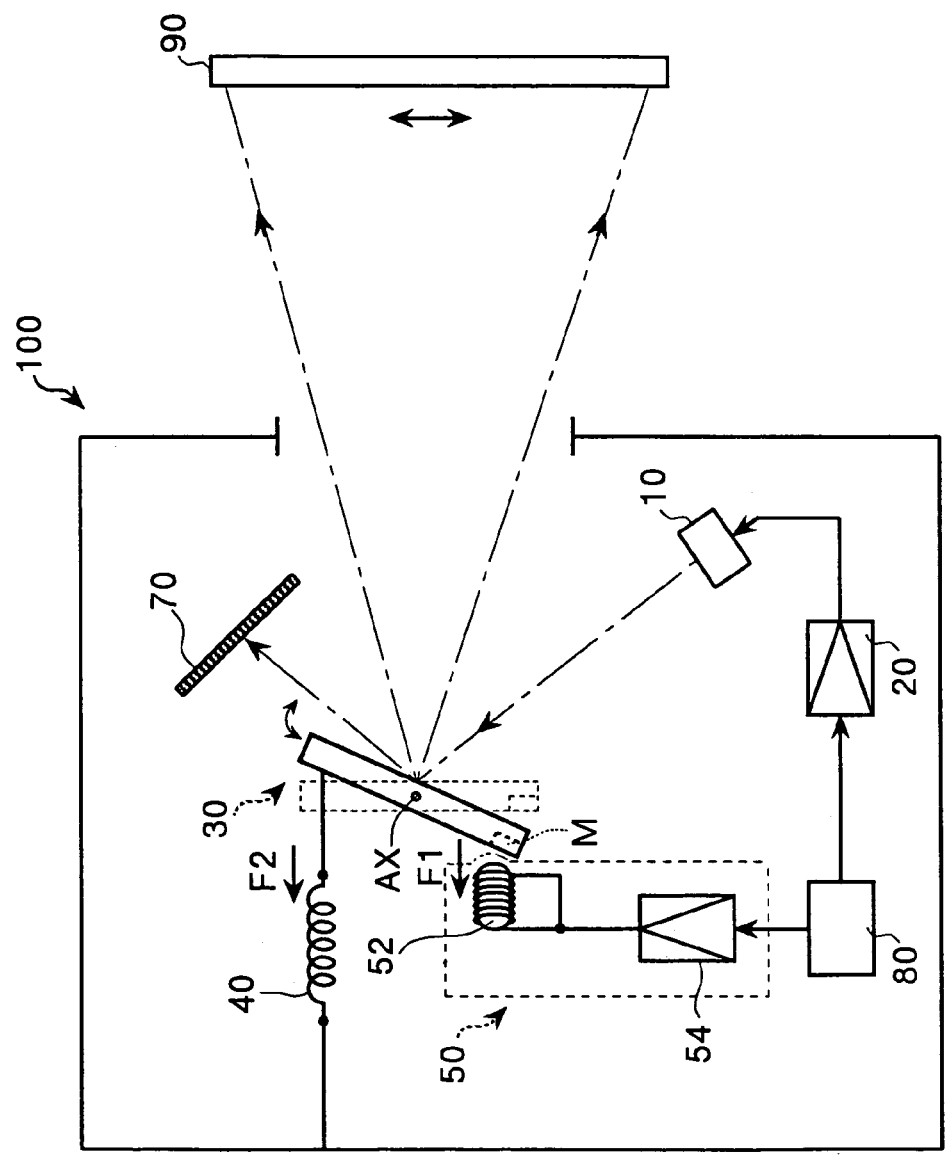
FIG. 1 is a schematic of a projector according to a first embodiment of the present invention.

FIG. 1 is a schematic of a projector according to a first embodiment of the present invention. A projector 100 is a front-type projector in which an image is observed from a projection side to project light to a screen 90. The projector 100 has a laser beam source 10. A light source driving unit 20 drives the laser beam source 10 according to image signals from a control circuit 80. The laser beam source 10 modulates and supplies linear laser beam according to the image signals.

Figure 2:
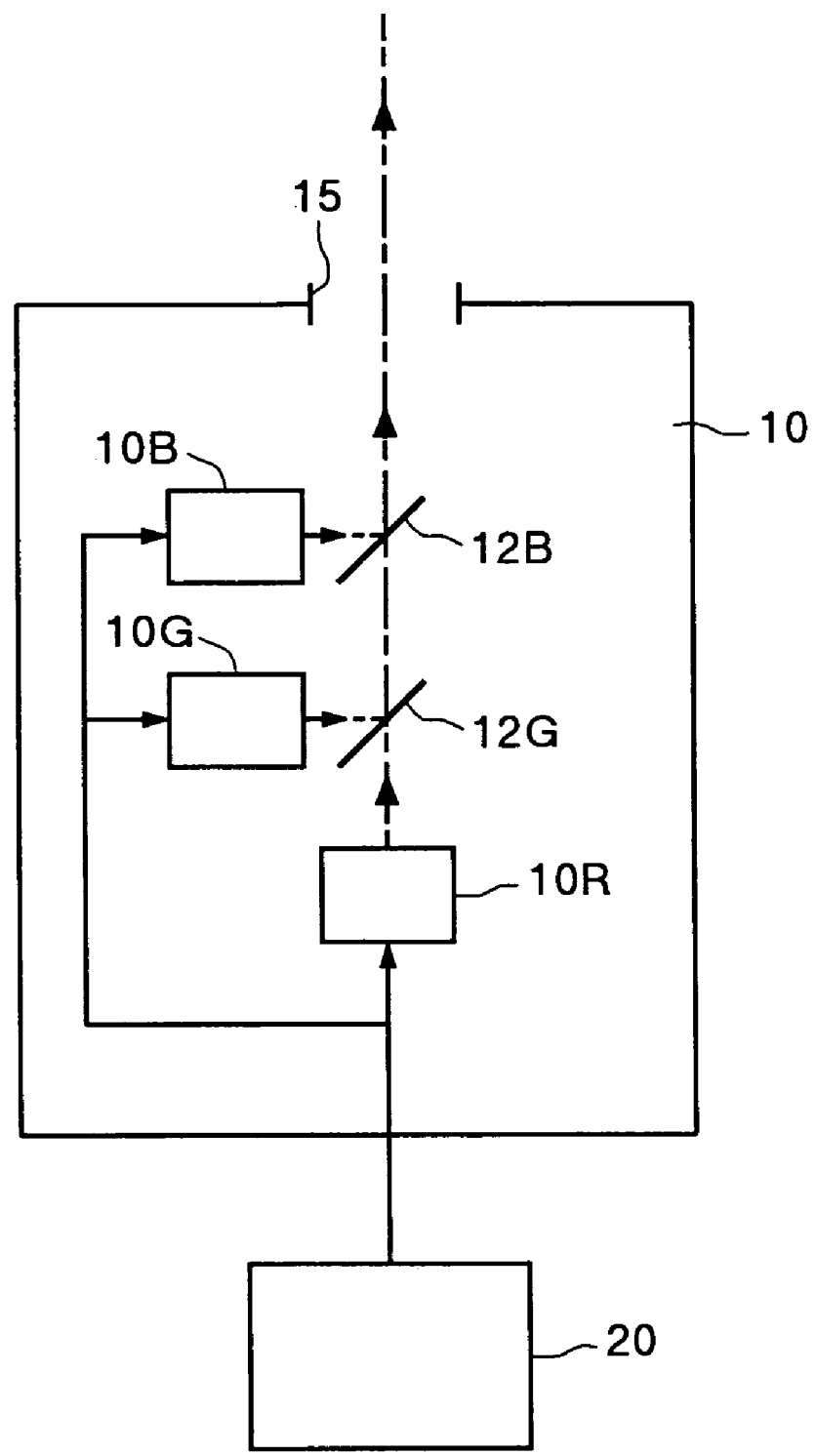
FIG. 2 is a drawing of a structure of a laser beam source and a light source driving unit.

A detail structure of the laser beam source 10 and the light source driving unit 20 is shown in FIG. 2. The laser beam source 10 has a first color laser beam source 10 red (R), a second color laser beam source 10 green (G), and a third color laser beam source 10 blue (B). The first color laser beam source 10R supplies red laser beam (hereinafter, referred to as "R light") modulated according to the image signals. The second color laser beam source 10G supplies green laser beam (hereinafter, referred to as "G light") modulated according to the image signals. The third color laser beam source 10B supplies blue laser beam (hereinafter, referred to as "B light") modulated according to the image signals. The light source driving unit 20 drives each of the color laser beam sources 10R, 10G, and 10B according to the image signals, respectively. Moreover, each of the color lights is shaped into linear light, respectively. A semiconductor laser or a solid laser can be used for each laser beam source 10R, 10G, or 10B.

A dichroic mirror 12G allows penetration of R light and reflects G light. A dichroic mirror 12B allows penetration of R light and G light and reflects B light. Each of the color lights from the corresponding laser beam sources 10R, 10G, and 10B is synthesized by the dichroic mirrors 12G and 12B, and emitted from an opening 15. Accordingly, the laser beam source 10 synthesizes modulated lights of each color light and emits them.

Returning to FIG. 1, the modulated lights of R light, G light and B light from the laser beam source 10 enter a galvano-mirror 30 that serves as a scanning unit. Assume that laser beam is shaped into linear light parallel to a first direction that is the direction perpendicular to the paper in FIG. 1. The reflection face of the galvano-mirror 30 is rotated around a predetermined axis AX. Thus, the galvano-mirror 30 scans the light from the laser beam source 10 in a second direction that is the direction approximately perpendicular to the first direction. The galvano-mirror 30 shuttles to and fro around the predetermined axis AX to perform rotational movement. The laser beam reciprocates in the second direction that is the direction approximately perpendicular to the linear longitudinal direction and scans on the screen 90. By repeating the movement, the projector 100 displays a projection image. The galvano-mirror 30 has a permanent magnet M inside at the approximate center on one side of the galvano-mirror 30.

A scan driving unit 50 drives the galvano-mirror 30 according to the image signals from the control circuit 80. The galvano-mirror 30 performs its scan action by the drive from the scan driving unit 50. The scan driving unit 50 consists of a coil 52 and a driver 54. The driver 54 passes a current corresponding to the image signals from the control circuit 80 to the coil 52. The coil 52 generates a magnetic force by the passage of the current from the driver 54. The coil 52 is arranged in the proximity to a leading end of the galvano-mirror 30. The galvano-mirror 30 is arranged so that the coil 52 and the permanent magnet M are opposite to each other. The coil 52 generates a magnetic field between the coil 52 and the permanent magnet M due to the current passing through the coil 52. Then, the magnetic force between the coil 52 and the permanent magnet M generates an attractive force. Therefore, the galvano-mirror 30 is rotated in the direction that the permanent magnet M and the coil 52 are attracted to each other by a current passing through the coil 52. The attractive force generated by the current passing through the coil 52 is referred to as a first force. The first force is shown by an arrow F1 in FIG. 1.

The retaining unit made of a spring 40 that is an elastic member. One end of the spring 40 is fixed to the galvano-mirror 30. The spring 40 is arranged on the same side where the coil 52 is arranged, faces to the coil 52 of the galvano-mirror 30, and fixed at a position approximately symmetrical to the position facing to the coil 52 with respect to the axis AX. The other end of the spring 40 is fixed to the wall of the projector 100. The spring 40 stops and retains the galvano-mirror 30 at a predetermined position by its contraction. A bias force generated by contraction of the spring 40 is referred to as a second force. The second force is shown by an arrow F2 in FIG. 1.

The galvano-mirror 30 receives the first force F1 generated by the scan driving unit 50 and the second force F2 generated by the spring 40. Both the first and second forces F1 and F2 counteract each effect, respectively. The first force F1 acts on the galvano-mirror 30 when the first force F1 is greater than the second force F2. At this time, the galvano-mirror 30 is rotated in the direction in which the coil 52 and the permanent magnet M attract to each other. When the second force F2 is greater than the first force F1, the second force F2 acts on the galvano-mirror 30. At this time, the galvano-mirror 30 is rotated in the direction in which the coil 52 and the permanent magnet M are separated from each other.

The driver 54 passes a current with a predetermined magnitude (intensity) to the coil 52. The coil 52 generates a magnetic field corresponding to the magnitude of the current. The scan driving unit 50 changes the intensities of the first force F1 periodically according to the magnitude of the magnetic field generated corresponding to the magnitude of the current. On the other hand, the second force F2 is constant all the time. Therefore, by changing the intensities of the first force F1 periodically, the galvano-mirror 30 is rotated periodically. With this action, the galvano-mirror 30 carries out its scan action. For example, the galvano-mirror 30 carries out its scan action with the number of pixel (resolution) n×60 (Hz) in the direction in which the linear laser beam scans.

Figure 3A:
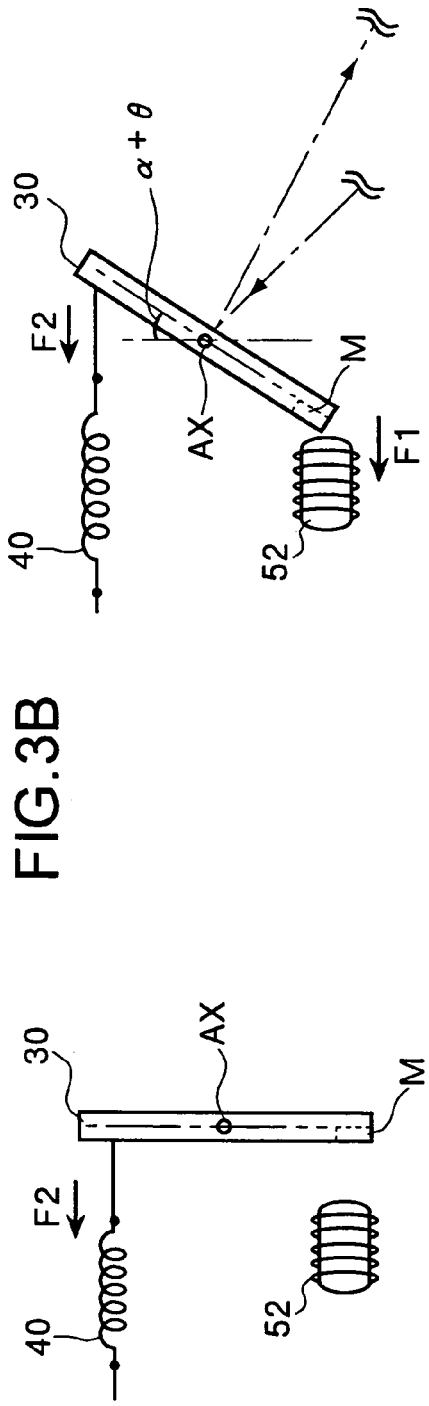
FIGS. 3A, 3B, 3C, and 3D are drawings of structure of a galvano-mirror, a retaining unit, and a scan driving unit.
Figure 3B:
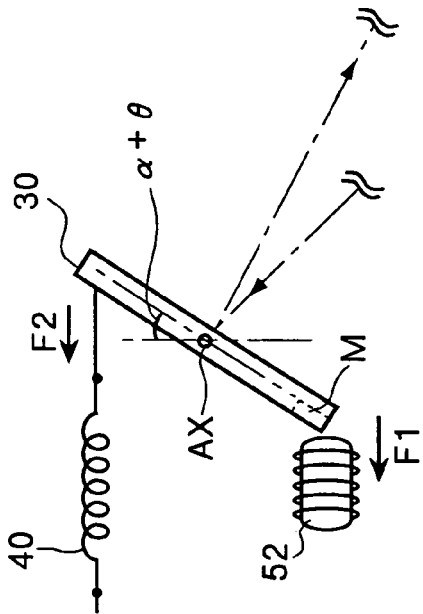
Figure 3C:
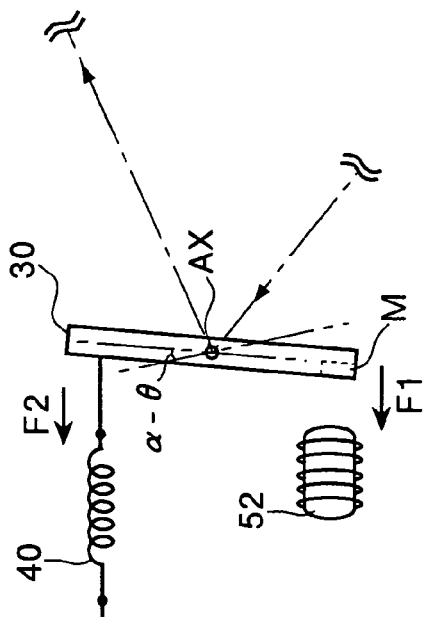
Figure 3D:
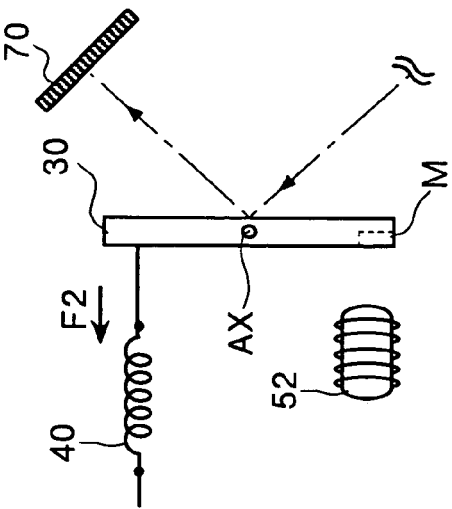
Figure 4:
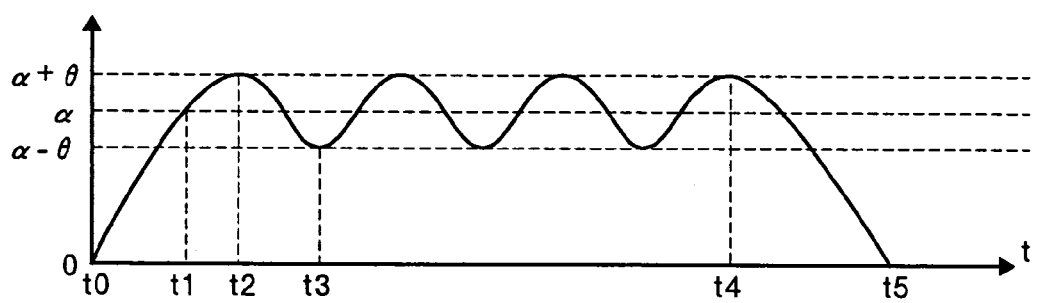
FIG. 4 is a graph for explaining a relation between the displacement of tilt angle of the galvano-mirror and time.

With the use of FIGS. 3A to 3D and FIG. 4, the scan action carried out by the galvano-mirror 30 and the retention thereof by the spring 40 are shown. The scan action of the galvano-mirror 30 by the scan driving unit 50 and the retention states of the galvano-mirror 30 by the spring 40 are shown in FIGS. 3A to 3D. FIG. 4 is a graph for explaining a relation between displacement of tilt angle of the galvano-mirror 30 and time. Time is plotted on the horizontal axis and tilt angle of the galvano-mirror 30 is plotted on the vertical axis. The tilt angles of the galvano-mirror 30 are indicated by setting the predetermined position, at which the galvano-mirror 30 is retained by the spring 40, to 0 for the reference value. The angle α in FIG. 4 shows an angle at an offset position that is the reference position in the scan action of the galvano-mirror 30. Furthermore, the angle θ shows a deflection angle of the galvano-mirror 30. The galvano-mirror 30 in its scan action is rotated with the centered angle α within the range of the angle ±θ.

FIG. 3A shows a state in which the scan driving unit 50 starts driving of the galvano-mirror 30. The time at this start is referred to as time t0. The galvano-mirror 30 is retained at the predetermined position by the second force F2 of the spring 40. A current required to allow the galvano-mirror 30 to move to the angle α of an offset position passes through the coil 52. After this, the galvano-mirror 30 first reaches the angle α of the offset position at time t1. From this position, the galvano-mirror 30 starts its scan action. The scan driving unit 50 makes the current to pass through the coil 52 stronger. Thus, the first force F1 becomes larger, which allows the galvano-mirror 30 to be rotated in the same direction as the direction in which the galvano-mirror 30 is rotated in the time period between time t0 and time t1. The state in which the galvano-mirror 30 is rotated up to the angle α+θ at time t2 is shown in FIG. 3B. At this time, the galvano-mirror 30 is at the maximum deflection angle in its scan action. The galvano-mirror 30 switches its rotation direction to the reverse direction at this position.

From the state shown in FIG. 3B, the scan driving unit 50 gradually makes the first force F1 weaker. At this time, the galvano-mirror 30 moves in the direction in which the coil 52 and the permanent magnet M are separated from each other by the second force F2. As is described, the galvano-mirror 30 switches its rotation direction at the position in the state shown in FIG. 3B to its reverse direction. As shown in FIG. 3C, the galvano-mirror 30 is at the position of the angle α−θ at time t3. At this time, the galvano-mirror 30 is at the minimum deflection angle in its scan action. At this angle position, the galvano-mirror 30 switches its rotation direction to its reverse direction again. By repetitions of switching directions, the galvano-mirror scans the linear laser beam.

Here, a case in which the current passing through the scan driving unit 50 stops or becomes lower than the predetermined value for any reason is taken into consideration. At this time, the first force F1 required for the galvano-mirror 30 to scan is not sufficient to counteract the second force F2 and further to carry out the scan action. This means that the first force F1 is insufficient or becomes 0. When the state in which the first force F1 is insufficient or 0 as described above continues, the galvano-mirror 30 has a difficulty in carrying out its normal scan action. The state in which the normal scan action is not carried out by the galvano-mirror 30 means that, for example, the scan action stops completely or is not carried out with a constant periodicity and at a predetermined speed. When the first force F1 becomes insufficient or 0, the galvano-mirror 30 moves in the minimum deflection angle direction (see FIG. 3C) by the second force F2 from the spring 40. Furthermore, the galvano-mirror 30 moves up to the reference position at which the angle is 0. Then, the galvano-mirror 30 is retained at the predetermined position where the angle is 0 by the second force F2 from the spring 40. A state in which the galvano-mirror 30 is retained by the second force F2 from the spring 40 after time t5 is shown in FIG. 3D. The galvano-mirror 30 returns to the same position as that shown in FIG. 3A. At this time, the laser beam reflected from the galvano-mirror 30 is shielded by a light shielding unit 70 (see FIG. 1).

This leads to prevention of the laser beam from being emitted to the outside of the projector 100.

When the first force F1 is insufficient for counteracting the second force F2 and further carrying out the scan action, or when the first force F1 becomes 0 for any reason, it becomes difficult for the galvano-mirror 30 to carry out its normal scan action. Moreover, when the first force F1 becomes insufficient or is 0, the galvano-mirror 30 is stopped and retained at the predetermined position by the action of the second force F2 from the spring 40. At this time, the light shielding unit 70 shields the laser beam reflected from the galvano-mirror 30. Owing to this action, when the scan action by the galvano-mirror 30 is not carried out normally, the laser beam can be prevented from being emitted and the laser beam generation can be directly shut down. As the result, an effect that the projector 100 can be improved in its safety is brought about. Furthermore, when the normal scan action is not carried out by the galvano-mirror 30, the second force F2 from the spring 40 is greater than the first force F1. Therefore, the second force F2 can stop and retain the galvano-mirror 30 at the predetermined position. Moreover, this makes it possible to shut down the laser beam generation directly. As the result, an effect that the projector 100 can be improved in its safety is brought about.

Figure 5A:
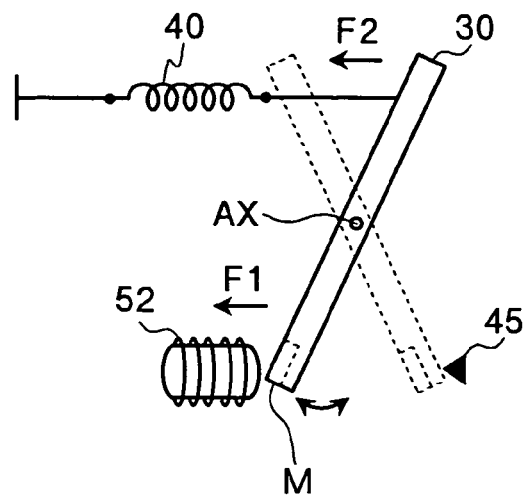
FIGS. 5A, 5B, and 5C are drawings of other structure examples of the galvano-mirror, the retaining unit, and the scan driving unit.
Figure 5B:
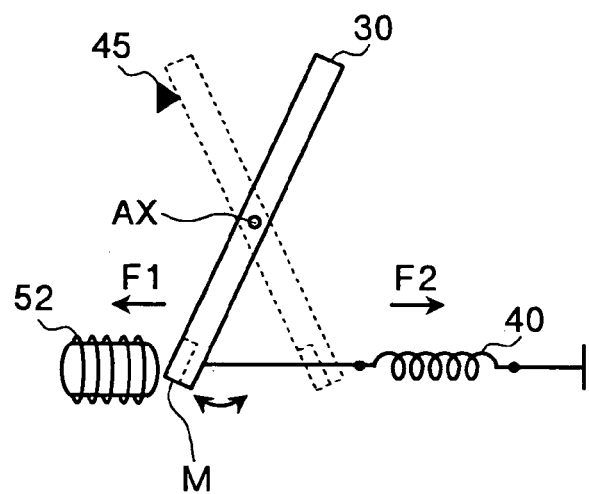
Figure 5C:
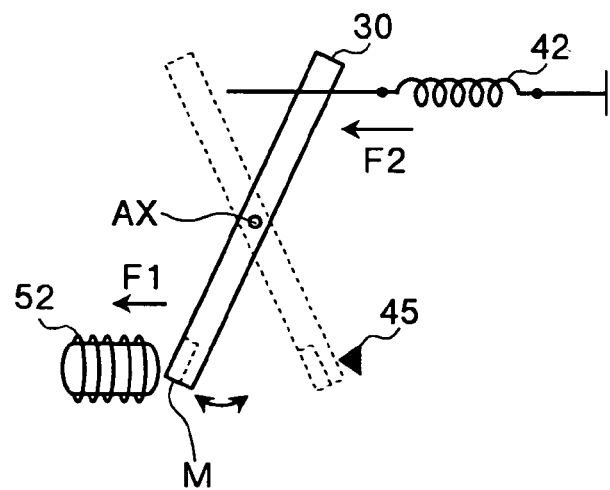

Other structure examples of the galvano-mirror 30, the scan driving unit 50, and the spring 40 are shown in FIG. 5A to 5C. As shown in FIG. 5A, a stopper 45 may be provided on the side opposite to the coil 52 as to the galvano-mirror 30. By providing the stopper 45, the galvano-mirror 30 retained by the spring 40 can be retained more stably. Retaining the galvano-mirror 30 more stably at the predetermined position allows the laser beam reflected from the galvano-mirror 30 to be shielded more accurately by the light shielding unit 70. Owing to this, when the galvano-mirror 30 has a difficulty in carrying out its normal scan action, the laser beam can accurately be prevented from emitting to the outside of the projector 100. In addition, a structure in which the spring 40 is fixed to the side opposite to the coil 52 as to the galvano-mirror 30 as shown in FIG. 5B may be employed.

An example in which the spring 40 is provided on the side opposite to the coil 52 and further fixed at the position approximately symmetrical to the coil 52 with respect to the axis AX as to the galvano-mirror 30 is shown in FIG. 5C. The spring 40 shown in FIG. 1 generates a bias force by its contraction. On the other hand, a spring 42 shown in FIG. 5C generates a bias force by its extension. The galvano-mirror 30 stops when the spring 42 extends maximally. Furthermore, the galvano-mirror 30 may be stopped by contacting with the stopper 45 in the extension process of the spring 42 as shown in FIG. 5C.

Figure 6A:
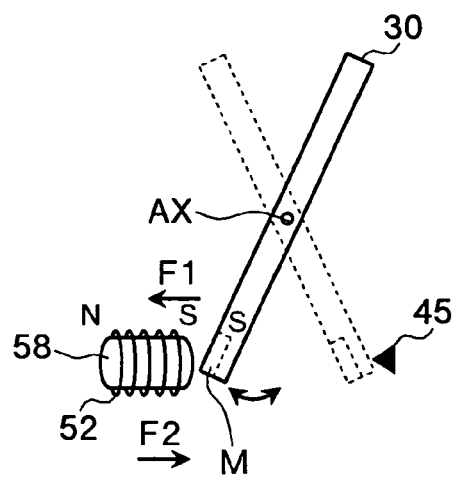
FIGS. 6A, 6B, 6C, and 6D are drawings of still other structure examples of the galvano-mirror, the retaining unit, and the scan driving unit.

Examples in which the permanent magnet is used as the retaining unit are shown in FIGS. 6A to 6D. The center portion of the coil 52 in the scan driving unit 50 shown in FIG. 6A is provided with a permanent magnet 58. The permanent magnet 58 and the permanent magnet M of the galvano-mirror 30 generate repulsion by mutual magnetic fields. For example, the permanent magnet 58 and the permanent magnet M are arranged with their south (S) poles facing to each other as shown in FIG. 6A. The repulsion generated between the permanent magnet 58 and the permanent magnet M at this time is referred to as a second force F2. When a current is passed through the coil 52, the coil 52 generates a magnetic field to counteract the magnetic field of the permanent magnet 58. At this time, the coil 52 and the permanent magnet M of the galvano-mirror 30 generate an attractive force by their mutual magnetic fields. The attractive force generated between the coil 52 and the permanent magnet M by a current passing through the coil 52 is referred to as a first force F1. The galvano-mirror 30 receives the first force F1 and second forces F2, similarly to when the spring 40 is used as the retaining unit.

Here, a case in which the current passing through the scan driving unit 50 stops or becomes lower than the predetermined value is taken into consideration. At this time, the first force F1 is insufficient for counteracting the second force F2 and further for carrying out the scan action, or the first force F1 becomes 0. This leads to a difficulty for the galvano-mirror 30 to carry out its normal scan action. At this time, the second force F2 from the permanent magnet 58 and the permanent magnet M is greater than the first force F1. Therefore, the galvano-mirror 30 is rotated in the direction in which the galvano-mirror 30 is separated from the permanent magnet 58 by the second force F2. Then, the second force F2 can stop and retain the galvano-mirror 30 at the predetermined position. As is described above, using the permanent magnet 58 and the permanent magnet M as the retaining unit makes it possible to stop and retain the galvano-mirror 30 at the predetermined position. This allows direct shutdown of the laser beam generation. As the result, an effect that the projector 100 is improved in its safety is brought about. The stopper 45 may be provided at the position where the galvano-mirror 30 is retained as shown in FIG. 6A. By providing the stopper 45, the galvano-mirror 30 retained by the second force F2 can be retained more stably.

Figure 6B:
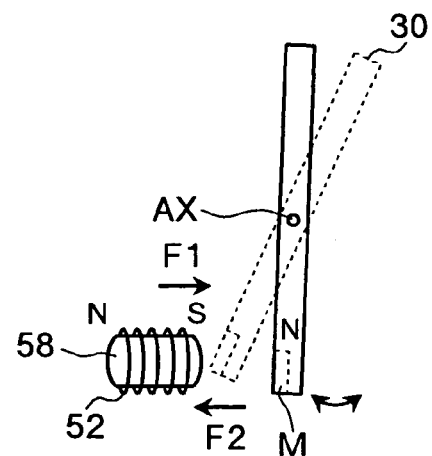

The permanent magnet 58 and the permanent magnet M of the galvano-mirror 30 may be arranged with the S pole of the permanent magnet 58 facing to the north N pole of the permanent magnet M as shown in FIG. 6B. The permanent magnet 58 and the permanent magnet M generate an attractive force by their mutual magnetic fields. The attractive force generated between the permanent magnet 58 and the permanent magnet M at this time is referred to as a second force F2. When a current is passed through the coil 52, the coil 52 generates a magnetic field to counteract the magnetic field of the permanent magnet 58. The coil 52 and the permanent magnet M generate repulsion by their mutual magnetic fields at this time. The repulsion generated between the coil 52 and the permanent magnet M by the current passing through the coil 52 is referred to as a first force F1. When the second force F2 is greater than the first force F1, the galvano-mirror 30 is rotated in the direction in which the galvano-mirror 30 is attracted to the permanent magnet 58. Then, the galvano-mirror 30 is stopped and retained at the predetermined position by contacting of the permanent magnet M with the permanent magnet 58.

Figure 6C:
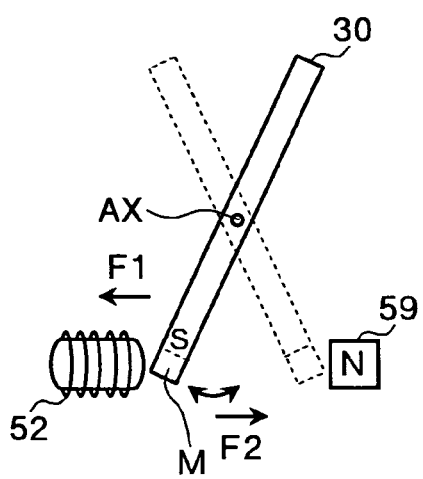

A permanent magnet may not be arranged at the center of the coil 52 but on the side opposite to the coil 52 as to the galvano-mirror 30. An example in which a permanent magnet 59 is provided on the side opposite to the coil 52 as to the galvano-mirror 30 is shown in FIG. 6C. The permanent magnet 59 and the permanent magnet M of the galvano-mirror 30 generate an attractive force by their mutual magnetic fields. For example, the permanent magnet 59 and the permanent magnet M are arranged with the N pole of the permanent magnet 59 facing to the S pole of the permanent magnet M as shown in FIG. 6C. The attractive force generated between the permanent magnet 59 and the permanent magnet M at this time is referred to as a second force F2. When a current is passed through the coil 52, the coil 52 generates a magnetic field to attract the magnetic field of the permanent magnet M. The coil 52 and the permanent magnet M generate an attractive force by their mutual magnetic fields at this time. The attractive force generated between the coil 52 and the permanent magnet M by a current passing through the coil 52 is referred to as a first force F1. When the second force F2 is greater than the first force F1, the galvano-mirror 30 is rotated in the direction in which the galvano-mirror 30 is attracted to the permanent magnet 59. Then, the galvano-mirror 30 is stopped and retained at the predetermined position by contacting of the permanent magnet M with the permanent 59.

Figure 6D:
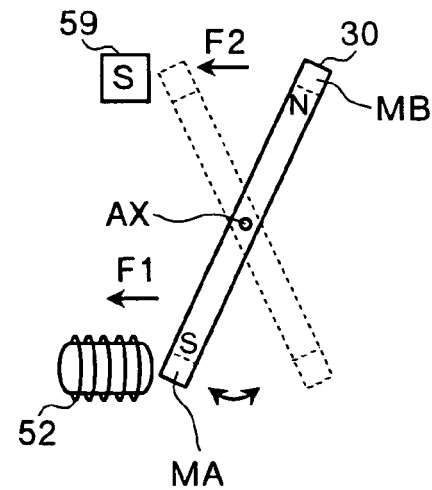

An example in which permanent magnets MA and MB are provided inside, respectively, at the approximate center of the two sides symmetrical to each other with respect to the axis AX of the galvano-mirror 30 is shown in FIG. 6D. The coil 52 is provided at the position facing the permanent magnet MA. Furthermore, the permanent magnet 59 is provided on the same side of the coil 52 as to the galvano-mirror 30 and is arranged at a position opposite to the permanent magnet MB. The permanent magnet 59 and the permanent magnet MB of the galvano-mirror 30 generate an attractive force by their mutual magnetic fields. For example, the permanent magnet 59 and the permanent magnet MB are arranged with the S pole of the permanent magnet 59 facing to the N pole of the permanent magnet MB as shown in FIG. 6D. The attractive force generated between the permanent magnet 59 and the permanent magnet MB at this time is referred to as a second force F2. When a current is passed through the coil 52, the coil 52 generates a magnetic field to attract the magnetic field of the permanent magnet MA. The attractive force generated between the coil 52 and the permanent magnet MA by the current passage through the coil 52 at this time is referred to as a first force F1. When the second force F2 is greater than the first force F1, the galvano-mirror 30 is rotated in the direction in which the galvano-mirror 30 is attracted to the permanent magnet 59. The galvano-mirror 30 is stopped and retained at the predetermined position by contacting with the permanent magnet 59.

Figure 7:
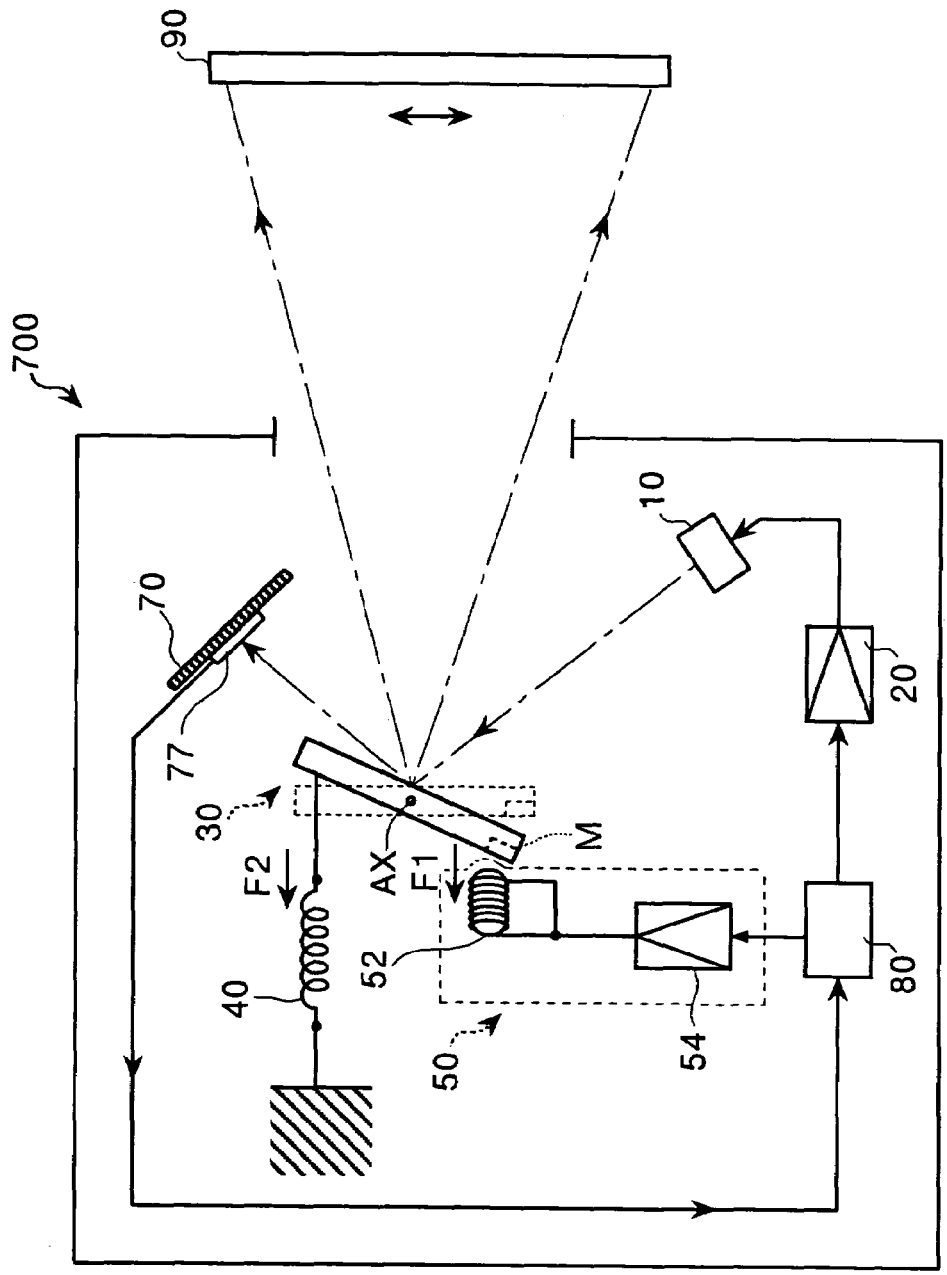
FIG. 7 is a drawing of a schematic structure of a projector according to a modification of the first embodiment.

A modification of the present embodiment will be explained next. A schematic structure of a projector 700 that is a modification of the present embodiment is shown in FIG. 7. A case where the first force F1 is insufficient to counteract the second force F2 and to further carry out the scan action or the first force F1 becomes 0 for any reason is taken into consideration. The galvano-mirror 30 is retained at the predetermined position by the second force F2 from the spring 40 in a similar way to that in the projector 100. The laser beam reflected from the galvano-mirror 30 enters the light shielding unit 70 at this time. The projector 700 has a detecting unit 77 for detecting the laser beam incident on the light shielding unit 70. The detecting unit 77 transmits signals to the light source driving unit 20 by detecting the laser beam. Transmitting the signals from the detecting unit 77 to the light source driving unit 20 may be through the medium of the control circuit 80 as shown in FIG. 7. When the detecting unit 77 transmits the signals to the light source driving unit 20, it immediately stops supplying the laser beam from the laser beam source 10. Owing to this, when the galvano-mirror 30 cannot carry out its scan action normally, generation of the laser beam can be directly shut down. Furthermore, owing to this shutdown, prolongation of irradiation time of the laser beam to the light shielding unit 70 can be prevented, thereby preventing the light shielding unit 70 from being burnt. As the result, an effect that the projector 700 can be improved in its safety is brought about.

Figure 8:
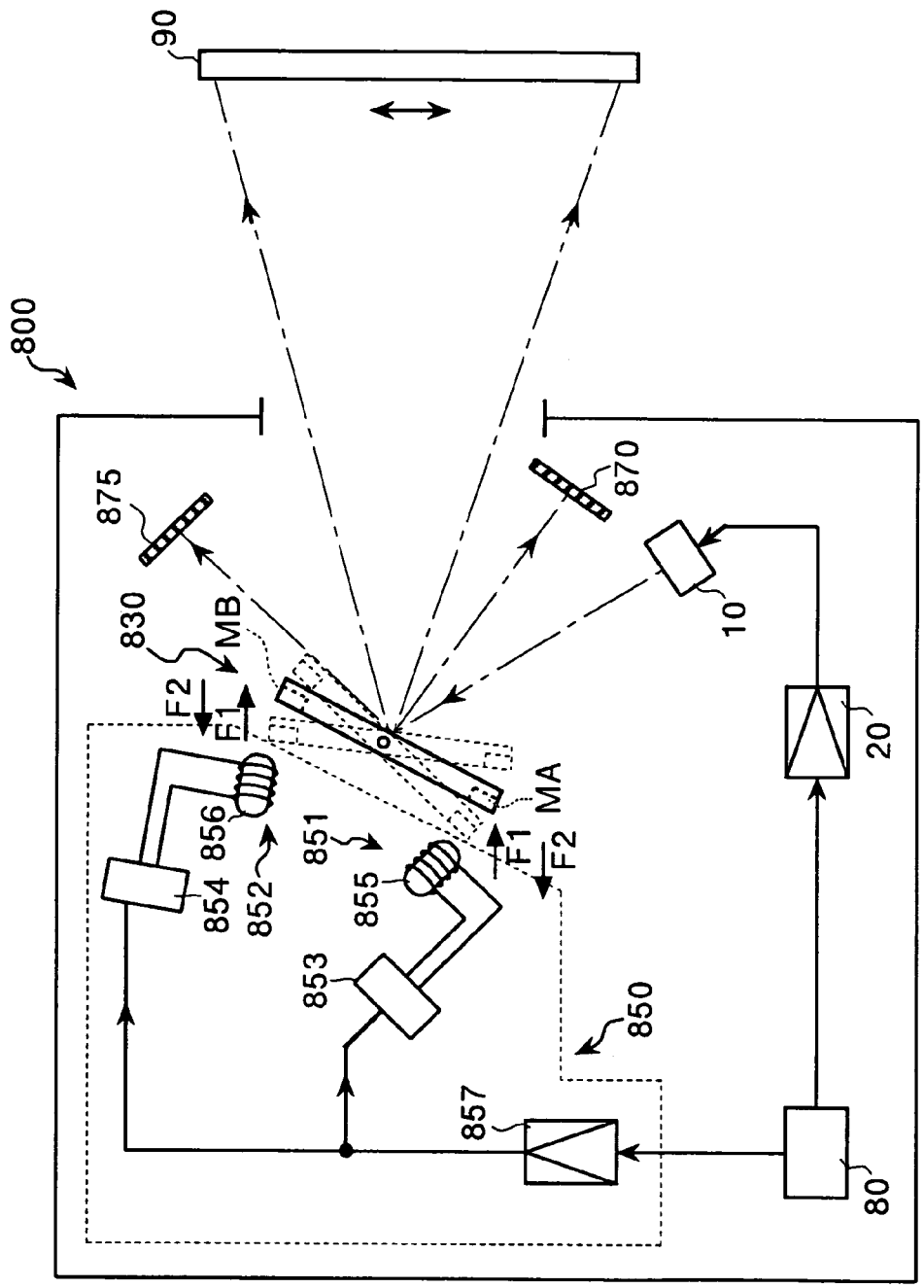
FIG. 8 is a drawing of a schematic structure of a projector according to a second embodiment of the present invention.
Figure 10A:
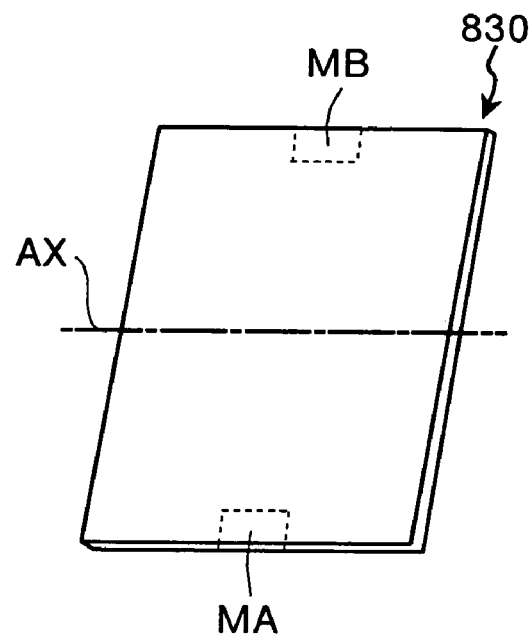
FIG. 10A is a drawing of a schematic structure of the galvano-mirror.

A schematic structure of a projector according to the second embodiment of the present invention is shown in FIG. 8. The same numerals are used for the same units as those of the projector 100 of the first embodiment and the overlaps of their explanations are avoided. A projector 800 of the present embodiment is characteristic in that it has two predetermined positions at which a scanning unit is stopped by a retaining unit. A modulated light of R light, G light and B light from the laser beam source 10 enter a galvano-mirror 830 that serves as the scanning unit. An example of the galvano-mirror 830 is shown in FIG. 10A. The glavano-mirror 830 has a permanent magnet MA and a permanent magnet MB arranged inside, respectively, at the approximate center of the two sides symmetrical to each other with respect to the axis AX of the galvano-mirror 830.

Assume that the laser beam is shaped in linear light parallel to a first direction that is the direction perpendicular to the paper in FIG. 8. The reflection face of the galvano-mirror 830 is rotated around the predetermined axis AX. This allows the galvano-mirror 830 to scan the light from the laser beam source 10 in a second direction that is the direction approximately perpendicular to the first direction. The galvano-mirror 830 shuttles to and fro around the predetermined axis AX to perform rotational movement. The laser beam reciprocates in the second direction that is the direction approximately perpendicular to the linear longitudinal direction and scans on the screen 90 shown in FIG. 8. By repeating the movement, the projector 800 displays a projection image.

Returning to FIG. 8, a scan driving unit 850 drives the galvano-mirror 830 according to image signals from the control circuit 80. The galvano-mirror 830 performs its scan action by the drive from the scan driving unit 850. The scan driving unit 850 consists of a first coil 851, a second coil 852, a first driver 853, a second driver 854, and a third driver 857. The third driver 857 sends image signals to the first driver 853 and the second driver 854. The first driver 853 passes a current corresponding to the image signals to the first coil 851. The second driver 854 passes a current corresponding to the image signals to the second coil 852.

The center portion of the first coil 851 is provided with a permanent magnet 855. The galvano-mirror 830 is arranged so as to allow the first coil 851 and the permanent magnet MA to face to each other. The permanent magnet 855 and the permanent magnet MA of the galvano-mirror 830 generate an attractive force by their mutual magnetic fields. The center portion of the second coil 852 is provided with a permanent magnet 856. The galvano-mirror 830 is arranged so as to allow the second coil 852 and the permanent magnet MB to face to each other. The permanent magnet 856 and the permanent magnet MB of the galvano-mirror 830 generate an attractive force by their mutual magnetic fields. The attractive forces generated between the permanent magnet 855 and the permanent magnet MA, and between the permanent magnet 856 and the permanent magnet MB at this time are referred to as a second force F2, respectively.

When a current is passed through the first coil 851, the first coil 851 generates a magnetic field to counteract the magnetic field of the permanent magnet 855. The first coil 851 and the permanent magnet MA of the galvano-mirror 830 generate repulsion by their mutual magnetic fields at this time. In addition, when a current is passed through the second coil 852, the second coil 852 generates a magnetic field to counteract the magnetic field of the permanent magnet 856. The second coil 852 and the permanent magnet MB of the galvano-mirror 830 generate repulsion by their mutual magnetic fields at this time. The repulsion generated between the first coil 851 and the permanent magnet MA by the current passage through the first coil 851, and the repulsion generated between the second coil 852 and the permanent magnet MB by the current passage through the second coil 852 at this time are referred to as a first force F1, respectively. The galvano-mirror 30 receives the first force F1 and the second force F2, similarly to the case in which an elastic member is used for the retaining unit.

The scan driving unit 850 allows each of the phases of the currents passed from the third driver 857 to the first driver 853 and to the second driver 854 to be shifted by one half period. Accordingly, a period when a strong repulsion is generated between the first coil 851 and the permanent magnet MA, and a period when a strong repulsion is generated between the second coil 852 and the permanent magnet MB are alternately set, which allows the intensity of the first force F1 to be changed periodically. On the other hand, the second force F2 is constant all the time. Therefore, the galvano-mirror 830 is periodically rotated by changing the intensity of the first force F1 periodically. This allows the galvano-mirror 830 to carry out its scan action.

A case in which the current passing through the scan driving unit 850 stops or becomes lower than the predetermined value for any reason is taken into consideration. At this time, the first force F1 for scanning the galvano-mirror 830 is insufficient to counteract the second force F2 and further to perform the scan action, or the first force F1 becomes 0. When the first force F1 becomes insufficient or 0, the magnitude of the second force F2 becomes greater than that of the first force F1. Then, the galvano-mirror 830 comes in contact with the permanent magnet 855 by the second force F2 generated between the permanent magnet 855 and the permanent magnet MA, or the galvano-mirror 830 comes in contact with the permanent magnet 856 by the second force F2 generated between the permanent magnet 856 and the permanent magnet MB. This allows the galvano-mirror 830 to be stopped and retained at the predetermined position. Each of the permanent magnets 855 and 856 stops and retains the galvano-mirror 830 at the predetermined positions. Therefore, the projector 800 has two predetermined positions at which the galvano-mirror 830 is stopped and retained.

Figure 9A:
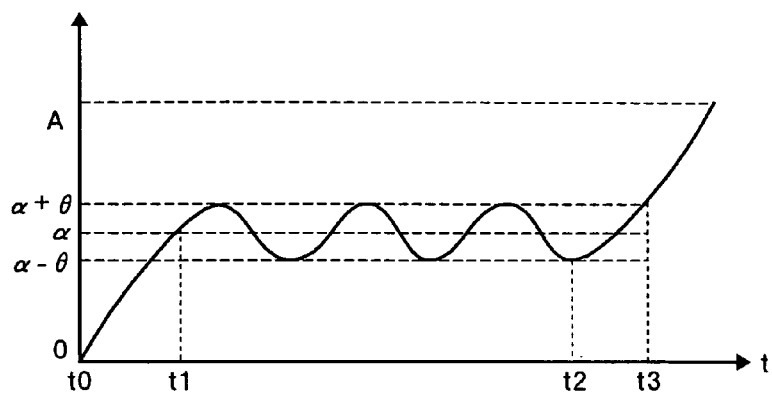
FIGS. 9A, 9B, and 9C are graphs for explaining scan action and intensity of current.
Figure 9B:
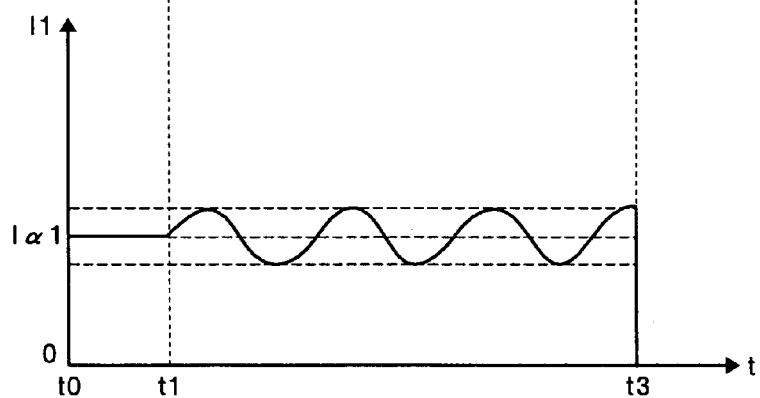
Figure 9C:
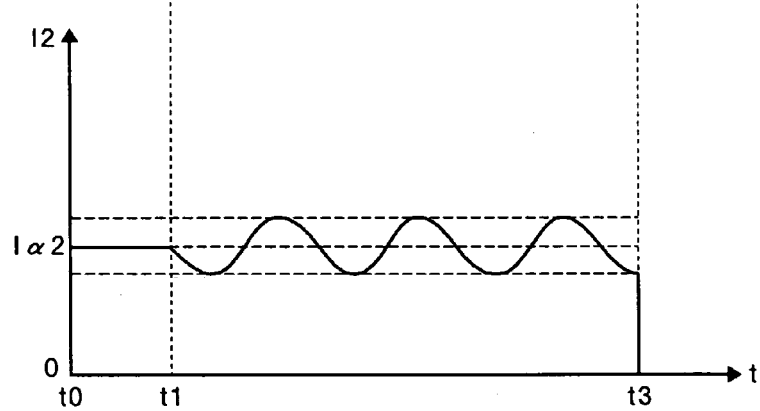

A relation between the displacement of tilt angle of the galvano-mirror 830 and time is shown in the graph in FIG. 9A. In the graph shown in FIG. 9A, the time is shown on the horizontal axis, and the tilt angle of the galvano-mirror 830 is shown on the vertical axis. The tilt angle of the galvano-mirror 830 is shown with a reference value 0 at which the galvano-mirror 830 is in contact with the permanent magnet 855. When a tilt angle of the galvano-mirror 830 is A, the galvano-mirror 830 is assumed to be in contact with the permanent magnet 856. The relation between the intensity of a current 11 passing through the first coil 851 and the time t is shown in FIG. 9B. The relation between the intensity of a current 12 passing through the second coil 852 and the time t is shown in FIG. 9C.

At time t0, the galvano-mirror 830 is in contact with the permanent magnet 855 and retained at the predetermined position by the attractive force generated between the permanent magnet 855 and the permanent magnet MA. At time t0, the galvano-mirror 830 may be in contact with the permanent magnet 856 and retained at the predetermined position by the attractive force generated between the permanent magnet 856 and the permanent magnet MB. In this case, the galvano-mirror 830 is at the position of the angle A at time t0. At time t1, the galvano-mirror 830 is at the position of the angle α that is the scan reference position. A current Iα1 required to rotate the galvano-mirror 830 up to the position of the angle α in the time period from time t0 to time t1 is passed through the first coil 851. A current Iα 2 required to prevent the galvano-mirror 830 from contacting with the permanent magnet 856 is passed through the second coil 852 in the time period from time t0 to time t1.

Each of the phases of the currents passed through the first coil 851 and the second coil 852 is shifted by one half period in the time period from time t1 to time t3. This allows the galvano-mirror 830 to perform its scan action in the time period from time t1 to time t3. Here, a case in which the current passing through the scan driving unit 850 stops or becomes lower than the predetermined value for any reason is taken into consideration. The first force F1 required for the galvano-mirror 830 to scan is not sufficient to counteract the second force F2 and further to perform the scan action at this time. This means that the first force F1 is insufficient or becomes 0. When the condition in which the first force F1 is insufficient or 0 continues, the galvano-mirror 830 has a difficulty in performing its normal scan action. For example, a case in which the current passing through the scan driving unit 850 stops at time t3 is taken into consideration. The galvano-mirror 830 is at a position nearer the permanent magnet 856, compared to the distance to the permanent magnet 855, with respect to the angle α that represents the reference position of the scan action. Therefore, when the second force F2 generated between the permanent magnet 856 and the permanent magnet M2 is greater than the first force F1, the galvano-mirror 830 is rotated up to the position at the angle A and comes in contact with the permanent magnet 856. This allows the galvano-mirror 830 to be stopped and retained at the predetermined position by the second force F2 generated between the permanent magnet 856 and the permanent magnet MB. FIG. 9A is a graph for explaining that the galvano-mirror 30 is rotated up to the position at the angle A after time t3. The laser beam reflected from the galvano-mirror 830 at this time is shielded by a light shielding unit 875 (see FIG. 8).

A case in which the current passing through the scan driving unit 850 at time t2 stops is taken into consideration. At this time, the galvano-mirror 830 is at the position closer to the permanent magnet 855, compared to the distance to the permanent magnet 856 with respect to the angle α that represents the reference position of the scan action. Therefore, when the second force F2 generated between the permanent magnet 855 and the permanent magnet MA is greater than the first force F1, the galvano-mirror 830 is rotated up to the position at the angle 0 and comes in contact with the permanent magnet 855. This allows the galvano-mirror 830 to be stopped and retained at the predetermined position by the second force F2 generated between the permanent magnet 855 and the permanent magnet MA. The laser beam reflected from the galvano-mirror 830 at this time is shielded by a light shielding unit 870 (see FIG. 8).

When the first force F1 is insufficient to counteract the second force F2 and further to perform the scan action, or when the first force F1 becomes 0 for any reason, the galvano-mirror 830 has a difficulty in performing its normal scan action. When the first force F1 becomes insufficient or 0, the galvano-mirror 830 comes in contact with either the permanent magnet 855 or the permanent magnet 856 by the second force F2. The galvano-mirror 830 is stopped and retained at one of the predetermined positions by being in contact with either of the permanent magnets 855 and 856. At this time, the light shielding units 870 and 875 shield the laser beam reflected from the galvano-mirror 830. Therefore, when the galvano-mirror 830 cannot perform its normal scan action, the laser beam can be prevented from being emitted and the laser beam generation can be shut down directly. As the result, an effect that the projector 800 can be improved in its safety is brought about. When the galvano-mirror 830 does not perform its normal scan action, the second force F2 generated between the permanent magnet 855 and the permanent magnet MA, or between the permanent magnet 856 and the permanent magnet MB is greater than the first force F1 with the use of the permanent magnets 855 and 856, and the permanent magnets MA and MB. Thus, the galvano-mirror 830 can be stopped and retained at the predetermined position by the second force F2. This allows direct shutdown of the laser beam generation. As the result, an effect that the projector 800 can be improved in its safety is brought about.

Similarly to the modification of the first embodiment, a detecting unit for detecting the laser beam incident on the light shielding units 870 and 875 of the projector 800 may be provided. When the detecting unit detects the laser beam, the light source driving unit 20 immediately stops supplying the laser beam from the laser beam source 10 at this time. This leads to an effect that the projector 800 can be improved in its safety, similarly to the projector 700 according to the modification of the first embodiment.

Figure 10B:
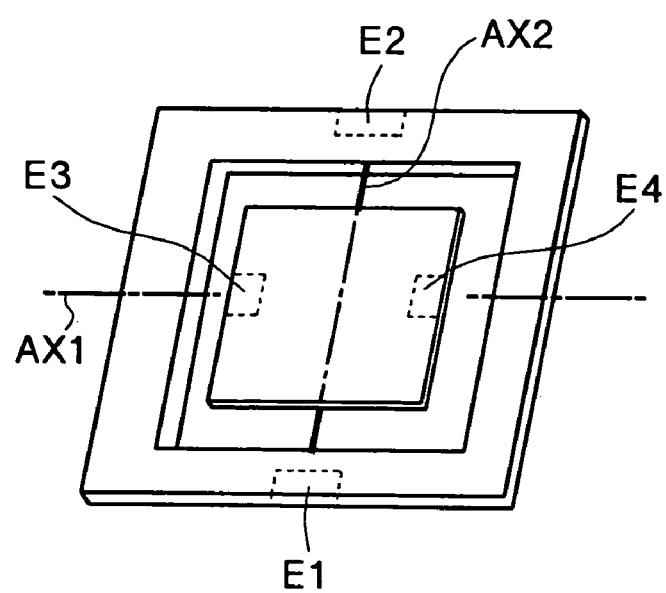
FIG. 10B is a drawing of a schematic structure of a micromirror.

In each example of projector 100, 700 or 800 described above, the galvano-mirrors 30 and 830 may scan the laser beam not only in the one-dimensional direction but also in the two-dimensional direction. At this time, the laser beam source 10 produces dotted laser beam. The galvano-mirrors 30 and 830 scan the dotted laser beam in the two-dimensional direction by being rotated around a first axis and a second axis approximately orthogonal to the first axis. The present invention can also be applied to this case. For the scanning unit, the mirror is not limited to a galvano-mirror, but, for example, a micromirror fabricated with the technology of MEMS (Micro Electro Mechanical Systems) can be used. A structure example of the micromirror to scan the laser beam in the two-dimensional direction is shown in FIG. 10B. The micromirror is rotated around two axes of an AX1 that is the first axis and an AX2 that is approximately orthogonal to the first axis AX1. This allows the micromirror to scan the laser beam incident at the approximate center of the micromirror in the two-dimensional direction. The micromirror is so small that it is difficult for a spring to be attached to the micromirror. It is also difficult to use a coil and a magnet. Therefore, the micromirror is provided, for example, with electrodes E1, E2, E3, and E4. Other electrodes are further provided near the electrodes E1, E2, E3, and E4. The micromirror can scan and be retained at the predetermined position by an electrostatic force generated by the electrodes provided to the micromirror and the other electrodes provided near the electrodes of the micromirror. This allows shutdown of the laser beam generation when the micromirror does not perform its scan action normally.

In each embodiment described above, a front projection type is used for the explanations. However, a rear-type projector that projects modulated lights from the backside of a screen may be used.

Figure 11:
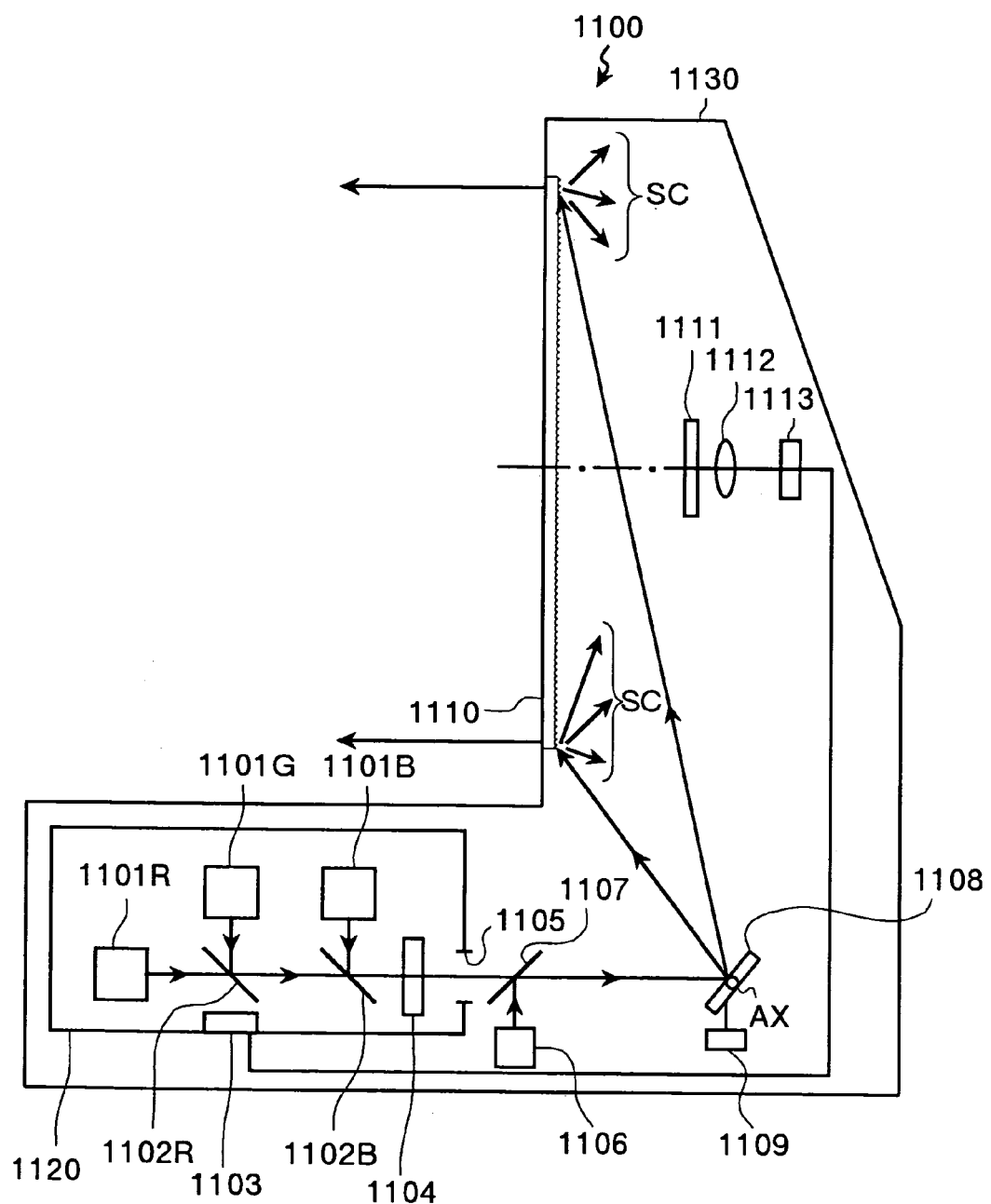
FIG. 11 is a drawing of a schematic structure of a projector according to a third embodiment of the present invention.

A schematic structure of a projector 1100 according to a third embodiment of the present invention is shown in FIG. 11. The projector 1100 of the present embodiment is the rear-type projector that projects modulated lights from the backside of a screen 1110. A first color laser beam source 1101R supplies R light modulated corresponding to the image signals. A second color laser beam source 1101G supplies G light modulated corresponding to the image signals. A third color laser beam source 1101B supplies B light modulated corresponding to the image signals. Each of the color laser beam sources 1101R, 1101G, and 1101B is individually driven and controlled by a controller 1103. Each of the color laser beam sources 1101R, 1101G, 1101B and the controller 1103 are housed in a laser unit 1120. For each of the color laser beam sources 1101R, 1101G, and 1101B, a semiconductor laser or a solid laser may be used.

A dichroic mirror 1102R allows penetration of R light and reflects G light. A dichroic mirror 1102B allows penetration of R light and G light and reflects B light. The laser beams from each of the color laser beam sources 1101R, 1101G, and 1101B are synthesized by the dichroic mirrors 1102R and 1102B, and pass through a shutter 1104. The shutter 1104 is open unless there is no abnormal occurrence on the screen 1110 as described later. The laser beams passing through the shutter 1104 are emitted from an opening 1105.

Each of the color laser beams emitted from the opening 1105 enters a galvano-mirror 1108 that serves as a scanning unit. A scan driving unit 1109 rotates the galvano-mirror 1108 in the two-axis directions AX in which the two axes are approximately orthogonal to each other. This allows the galvano-mirror 1108 to scan each color beam light within the predetermined surface. A light source unit for screen monitoring 1106 that emits invisible light is provided between the opening 1105 and the galvano-mirror 1108. As the invisible light, for example, infrared rays may be used. The infrared rays from the light source unit for screen monitoring 1106 enter a dichroic mirror 1107. The dichroic mirror 1107 allows penetration of R light, G light and B light, and reflects infrared rays. Therefore, the galvano-mirror 1108 scans R light, G light, B light, and infrared rays in the two-dimensional direction. Each of the color laser beams and the infrared rays reflected from the galvano-mirror 1108 enter the screen 1110. One face of the screen 1110 is surface-treated so as to be in a form of Fresnel lens. Therefore, each of the color laser beams incident from the oblique direction with respect to the screen 1110 is refracted in the predetermined direction, penetrated, and emitted by the screen 1110. An observer not shown observes each color laser beam that has penetrated through the screen 1110. The infrared rays are in the invisible light region. Thus, the observer does not perceive them even if they penetrate the screen 1110.

The screen 1110 reflects and scatters part of the each incident color laser beam and of the incident infrared rays to the incident side as lights scattered backward SC. The infrared rays reflected from the screen 1110 are received by a light receiving unit for screen monitoring 1113. A screen monitoring unit consists of the light source unit for screen monitoring 1106 and the light receiving unit for screen monitoring 1113. When the screen 1110 has an abnormality such as damage, burning or pinhole, the infrared rays may be emitted out of the main body of the projector 1100 main body through the abnormal portion of the screen 1110. Because of this, the intensity of the lights scattered backward SC of the infrared rays is reduced or becomes 0 at the abnormal portion. Monitoring an abnormality of the screen 1110 by judging whether the intensity of the infrared rays received by the light receiving unit for screen monitoring 1113 is lower than the predetermined value can be made possible.

More preferably, a filter 1111 that allows penetration of the invisible infrared rays, and absorbs or reflects the each color laser beam is desirably provided in the light path between the screen 1110 and the light receiving unit for screen monitoring 1113. The infrared rays that penetrate through the filter 1111 are condensed by a condenser 1112 onto a light receiving surface of the light receiving unit for screen monitoring 1113. Thus, only the infrared rays among the color laser beams of different colors and the infrared rays reflected from the screen 1110 to be effectively led to the light receiving unit for screen monitoring 1113.

The controller 1103 that also serves as a function of a beam light supply stopping unit stops the beam light supply when the intensity of the infrared rays received by the light receiving unit for screen monitoring 1113 is lower than the predetermined value. For example, the controller 1103 carries out one of the actions that are stopping of oscillation of each of the color laser beam sources 1101R, 1101G, and 1101B, shielding of the lights by closing the shutter 1104 while each of the color laser beam sources 1101R, 1101G, and 1101B is oscillated, shutting down of the power for each of the color laser beam sources 1101R, 1101G, and 1101B, and the like. Therefore, when the screen 1110 has an abnormality and the laser beam is emitted through the abnormal portion, the possibility of exposure to the laser beam can be reduced. When an abnormality of the screen 1110 is judged, a structure in which an alarm unit not shown sounds a beep or emits light as a warning to draw attention of the observer may be accepted.

In the structure shown in FIG. 11, the light axis of each of the light source unit for screen monitoring 1106 and the light axis of each color laser beam source 1101R, 1101G, or 1101B are in accordance with each other. More preferably, the light axis of the light source unit for screen monitoring 1106 may be inclined by a predetermined angle with respect to the light axis of each of the color laser beam sources 1101R, 1101G, and 1101B. This allows the infrared rays to scan the spatial portion ahead of the portion that each color laser beam scans. As the result, the abnormal portion can be detected before each color laser beam scan the abnormal portion of the screen 1110.

The light source for screen monitoring 1106 emits the infrared rays as modulated light that has a predetermined pulse train. The light receiving unit for screen monitoring 1113 receives the infrared rays having the pulse train. The controller 1103 that also serves as a function of a beam light supply stopping unit stops the beam light supply when the intensity of the pulse train of the infrared rays received by the light receiving unit for screen monitoring 1113 is lower than the predetermined value. When the screen 1110 has an abnormality, the reflectance at the abnormal portion is low. Thus, when the infrared rays are irradiated on a normal portion of the screen 1110, the light receiving unit for screen monitoring 1113 detects the pulse train. On the other hand, when the infrared rays are irradiated on the abnormal portion, the intensity of the pulse train is reduced at the light receiving unit for screen monitoring 1113, or the pulse train itself becomes missing. This allows further accurate monitoring of abnormalities of the screen 1110. When the pulse of the infrared rays is modulated, the filter 1111 that allows only infrared rays to penetrate is not necessarily required for band-pass.

Figure 12:
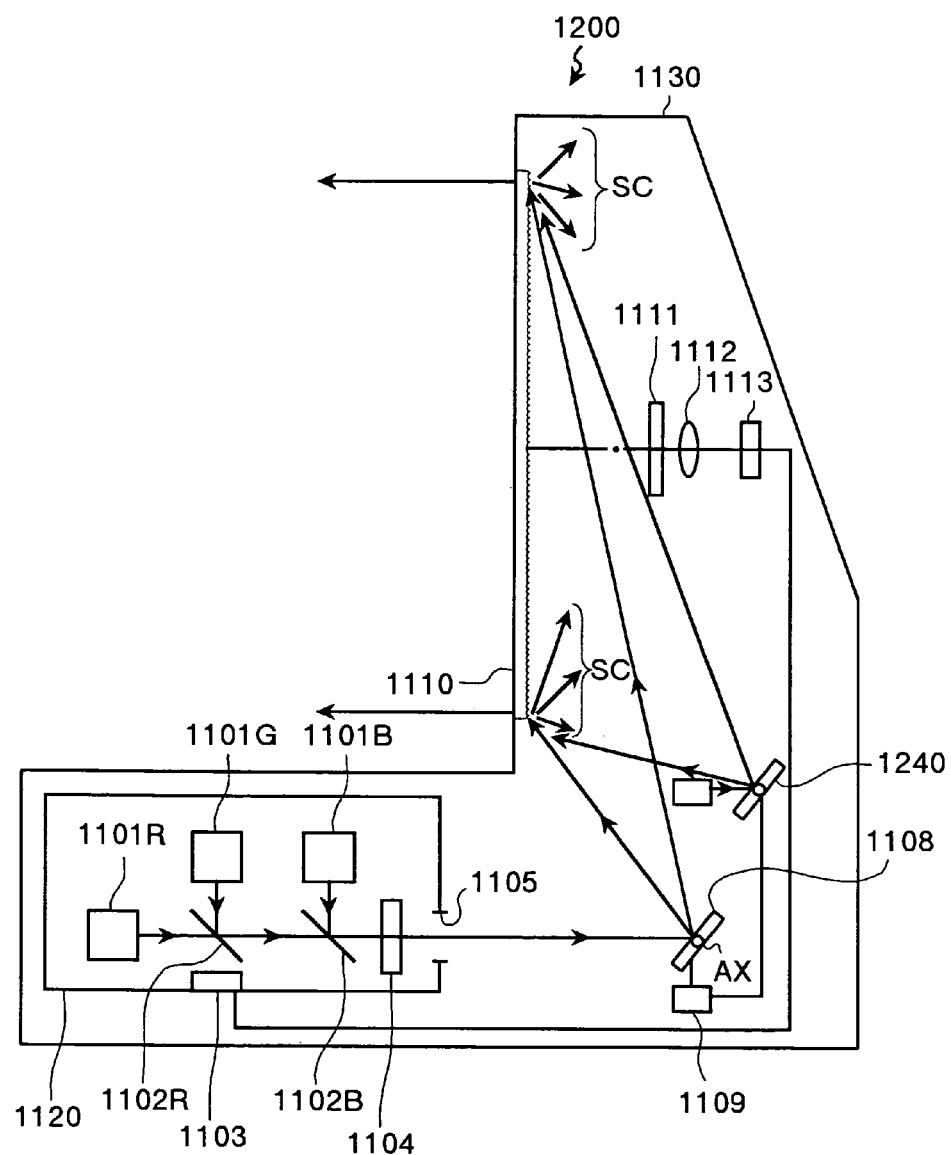
FIG. 12 is a drawing of a schematic structure of a projector of a modification of the third embodiment.

A structure of a projector 1200 according to a modification of the third embodiment is shown in FIG. 12. The position at which the light source unit for screen monitoring 1106 is different from that of the third embodiment. The same numerals are used for the same units as those in the third embodiment other than the above position and the overlaps of their explanations are avoided. In the present modification, the light source unit for screen monitoring 1106 is arranged so as to allow the infrared rays to make a light path independent of the light path of each color laser beam. The infrared rays from the light source for screen monitoring 1106 are incident on a galvano-mirror 1240 for infrared rays. The galvano-mirror 1240 is rotated in the two directions approximately orthogonal to each other by the driving unit for galvano-mirror 1109. This allows the infrared rays to scan on the screen 1110 in the two-dimensional direction. In the present modification, the allocated position for the light source unit for screen monitoring 1106 can be selected widely.

The screen 1110 may be monitored with the use of each color laser beam to form an image without using infrared rays for screen monitoring. In this case, the light receiving unit for screen monitoring 1113 receives the light reflected from the screen 1110 in each color laser beam projected to the screen 1110. The controller 1103 that also serves as a function of a beam light supply stopping unit calculates correlation values between each color laser beam projected to the screen 1110 and the light reflected from the screen 1110. When the correlation value calculated is smaller than the predetermined value, the supply of each color laser beam is stopped. When the screen 1110 has an abnormal portion, the correlation value of the beam light reflected from the abnormal portion becomes smaller, compared to that of the beam light reflected from the normal screen 1110. Accordingly, calculation of the correlation values makes it possible to monitor abnormalities of the screen 1110. The screen 1110 can be monitored in a simple structure without providing the light source unit for screen monitoring 1106 in this case. The light receiving unit for screen monitoring 1106 is not limited to receiving the light reflected from the screen 1110. For example, the screen 1110 is made of a light guiding member such as glass or transparent plastic. The light receiving unit for screen monitoring 1113 is provided at an end of the screen 1110. The light receiving unit for screen monitoring 1113 receives the light propagating inside the screen 1110. The above correlation values can be calculated with the use of this structure.

Figure 13:
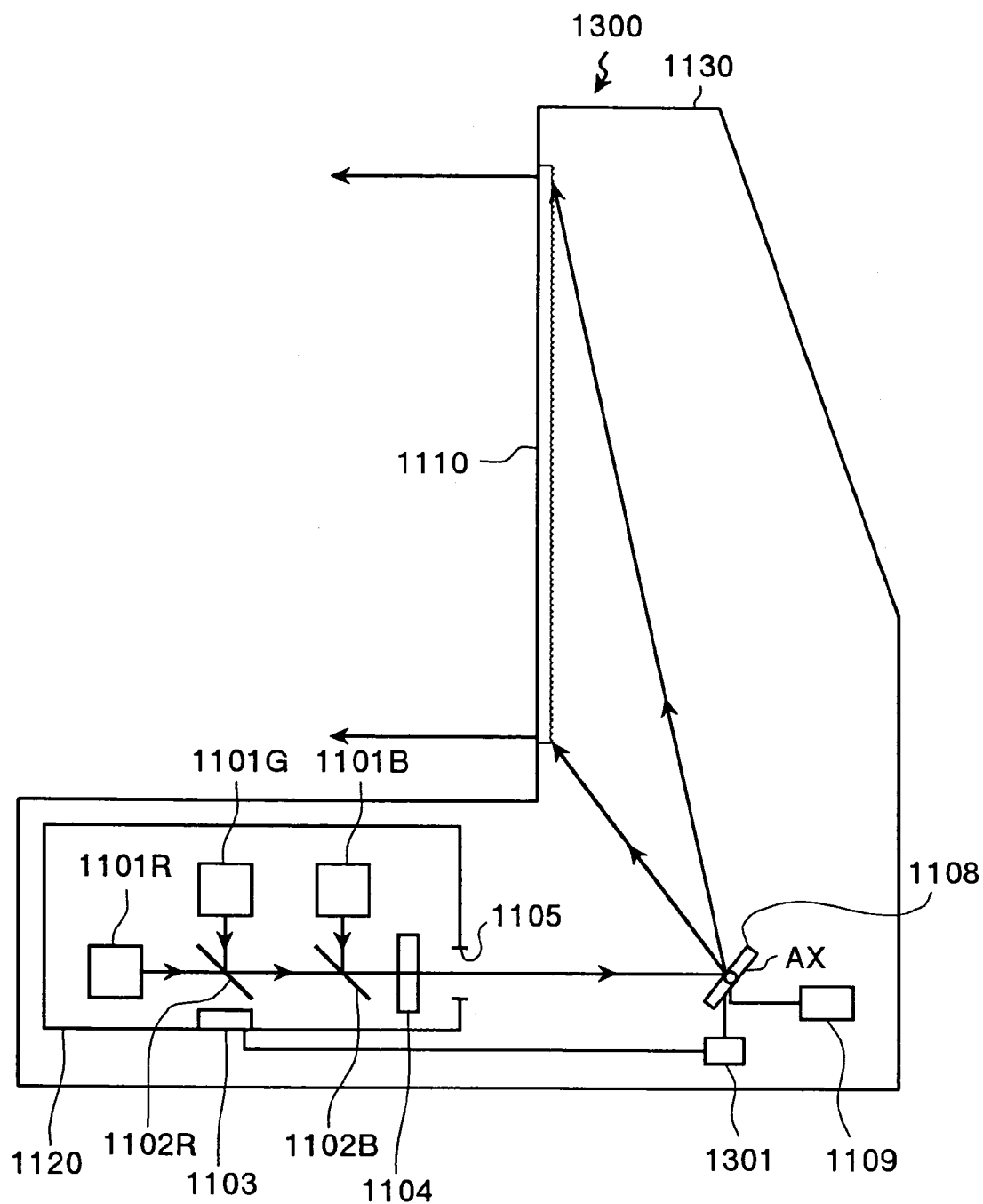
FIG. 13 is a drawing of a schematic structure of a projector according to a fourth embodiment of the present invention.

A schematic structure of a projector 1300 according to a fourth embodiment of the present invention is shown in FIG. 13. The same numerals are used for the same units as those of the third embodiment and the overlaps of their explanations are avoided. The screen 1110 is monitored in the third embodiment. On the other hand, the actions of the galvano-mirror 1108 that serves as a scanning unit are monitored in the present embodiment.

A scan monitoring unit 1301 is a galvano-mirror monitoring unit to monitor the scan action (rotation action) of the galvano-mirror 1108. As to the scan monitoring unit 1301, a structure in which the scan action of the galvano-mirror 1108 is electromagnetically detected, or a structure in which the scan action is detected by a photointerrupter can be accepted. The controller 1103 stops supplying the beam lights from the laser beam sources 1101R, 1101G, and 1101B according to the outputs from the scan monitoring unit 1301.

For example, when the laser beams from each of the color laser beam sources 1101R, 1101G, and 1101B are supplied while the galvano-mirror 1108 is stopped due to malfunction, one spot of the screen 1110 is kept on being irradiated by the laser beams. When the laser beam sources 1101R, 1101G, and 1101B with high power are used, the spot kept on being irradiated becomes damaged and the laser beams are emitted out of the projector 1300. In the present embodiment, when something abnormal occurs with the galvano-mirror 1108 for scanning each color laser beam and the beam light is not scanned normally, the supply of the beam light can be stopped.

Figure 14:
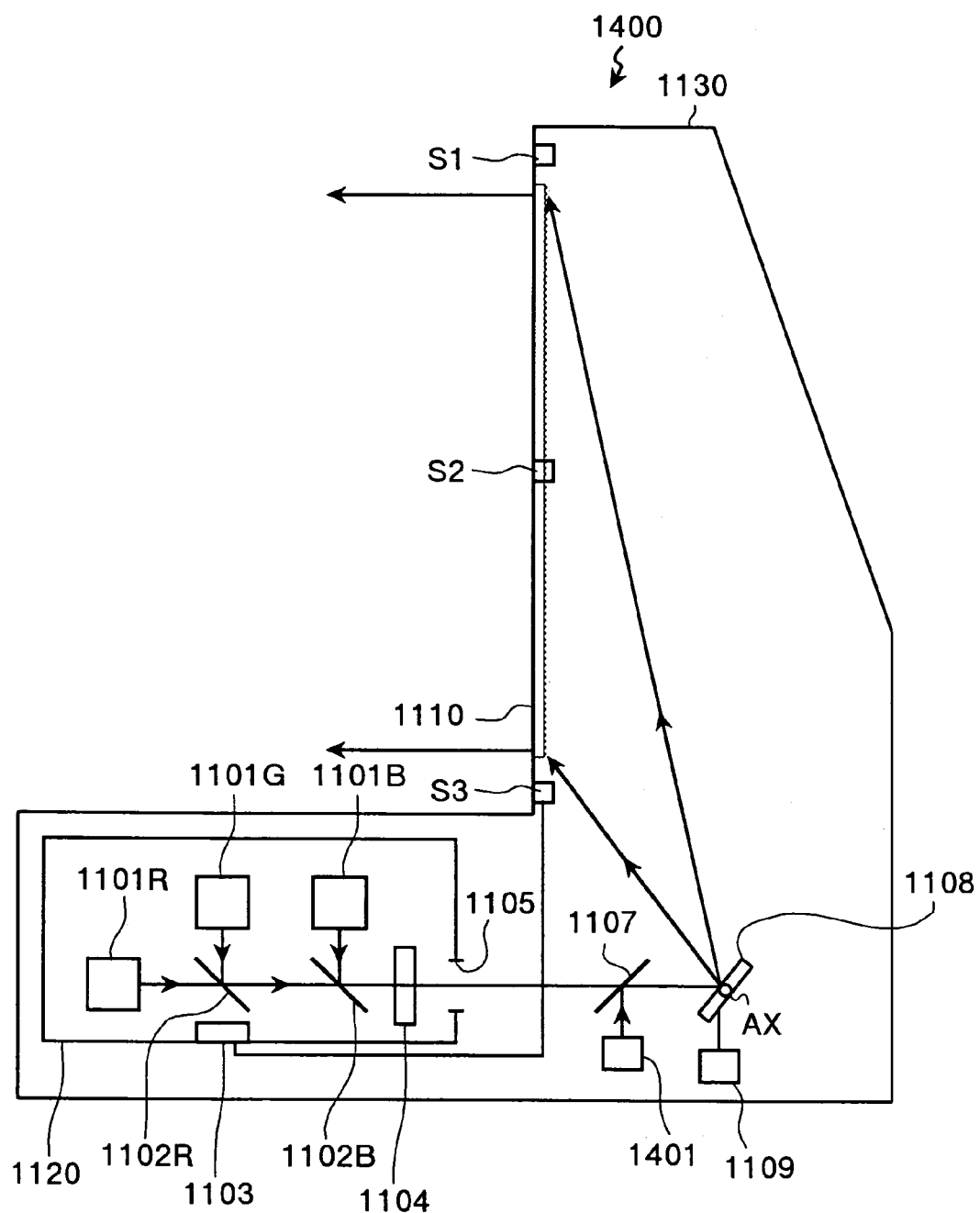
FIG. 14 is a drawing of a schematic structure of a modification of the fourth embodiment.

A schematic structure of a laser projector 1400 according to a modification of the fourth embodiment is shown in FIG. 14. In the present modification, the same numerals are used for the same units as those of the fourth embodiment and the overlaps of their explanations are avoided. The scan action of the galvano-mirror 1108 is monitored with the use of infrared rays in the modification.

Figure 15:
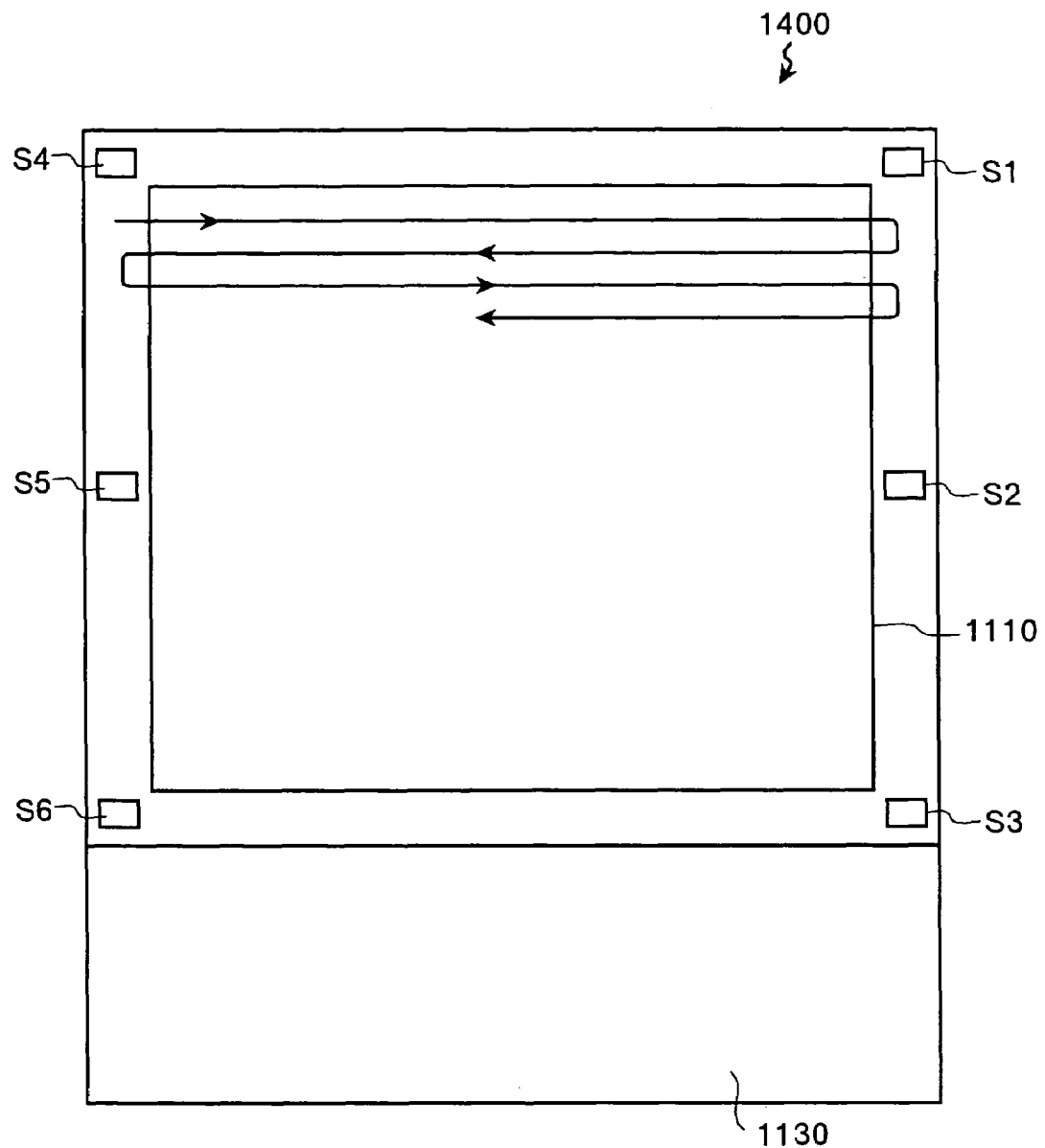
FIG. 15 is a front view of the modification of the fourth embodiment.

A light source for monitoring of scanning unit 1401 to emit infrared rays is provided between the laser unit 1120 and the galvano-mirror 1108. The light path of the infrared rays from the light source for monitoring of scanning unit 1401 is distorted by 90 degrees by the dichroic mirror 1107. The dichroic mirror 1107 allows penetration of the each color laser beam from the laser unit 1120 and reflects the infrared rays. Each color laser beam and the infrared rays to form an image are scanned in the two-dimensional direction and reflected in the direction to the screen 1110 by the galvano-mirror 1108. This means that the galvano-mirror 1108 scans each color beam light and infrared rays. A plurality of light receiving units for monitoring of scanning unit S1, S2, S3, S4, S5 and S6 to detect the infrared rays are provided near the outer periphery of the image display region of the screen 1110 as shown in FIG. 15. The scan monitoring unit consists of the light source for monitoring of scanning unit 1401 and the light receiving units for monitoring of scanning unit S1 to S6. The galvano-mirror 1108 is rotated so as to scan each color laser beam and the infrared rays in the region including the light receiving units for monitoring of scanning unit S1 to S6 provided near the outer periphery of the image display region. The modulation according to the image signals of each color laser beam is carried out in the image display region of the screen 1110.

When the galvano-mirror 1108 does not perform its scan action normally, the infrared rays are also not normally scanned. In this case, some of the light receiving units for monitoring of scanning unit S1 to S6 do not receive the infrared rays. Then, the controller 1103 stops supplying the beam light from the laser beam sources 1101R, 1101G, and 1101B according to the outputs from the light receiving units for monitoring of scanning unit S1 to S6. Accordingly, the action of the galvano-mirror 1108 can be monitored by receiving the infrared rays being scanned by the galvano-mirror 1108.

Figure 16:
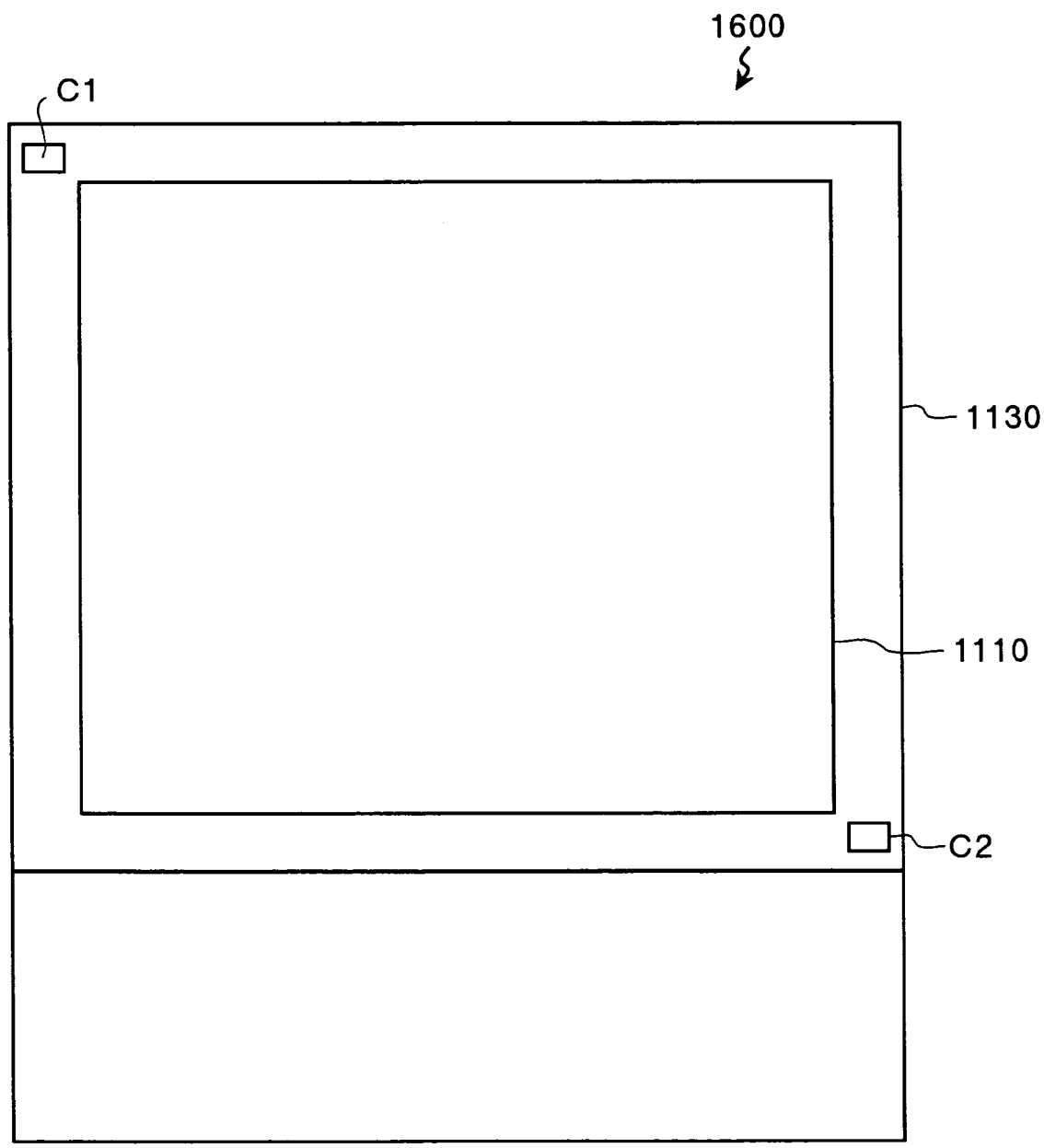
FIG. 16 is a front view of another modification of the fourth embodiment.

Reflecting members C1 and C2 to reflect the infrared rays may be provided near the outer periphery of the screen 1110 as shown in a projector 1600 of FIG. 16, in place of the light receiving units for monitoring of scanning unit S1 to S6 of the above modification. Reflecting mirrors or corner cubes may be used as the reflecting members C1 and C2. A light receiving unit for monitoring of scanning unit to receive the infrared rays from the reflecting members C1 and C2 is provided. Owing to this structure, the reflecting members C1 and C2 can reflect the infrared rays being scanned by the galvano-mirror 1108 to the predetermined direction. Thus, the scan action of the galvano-mirror 1108 can be monitored by receiving the reflected infrared rays.

Figure 17:
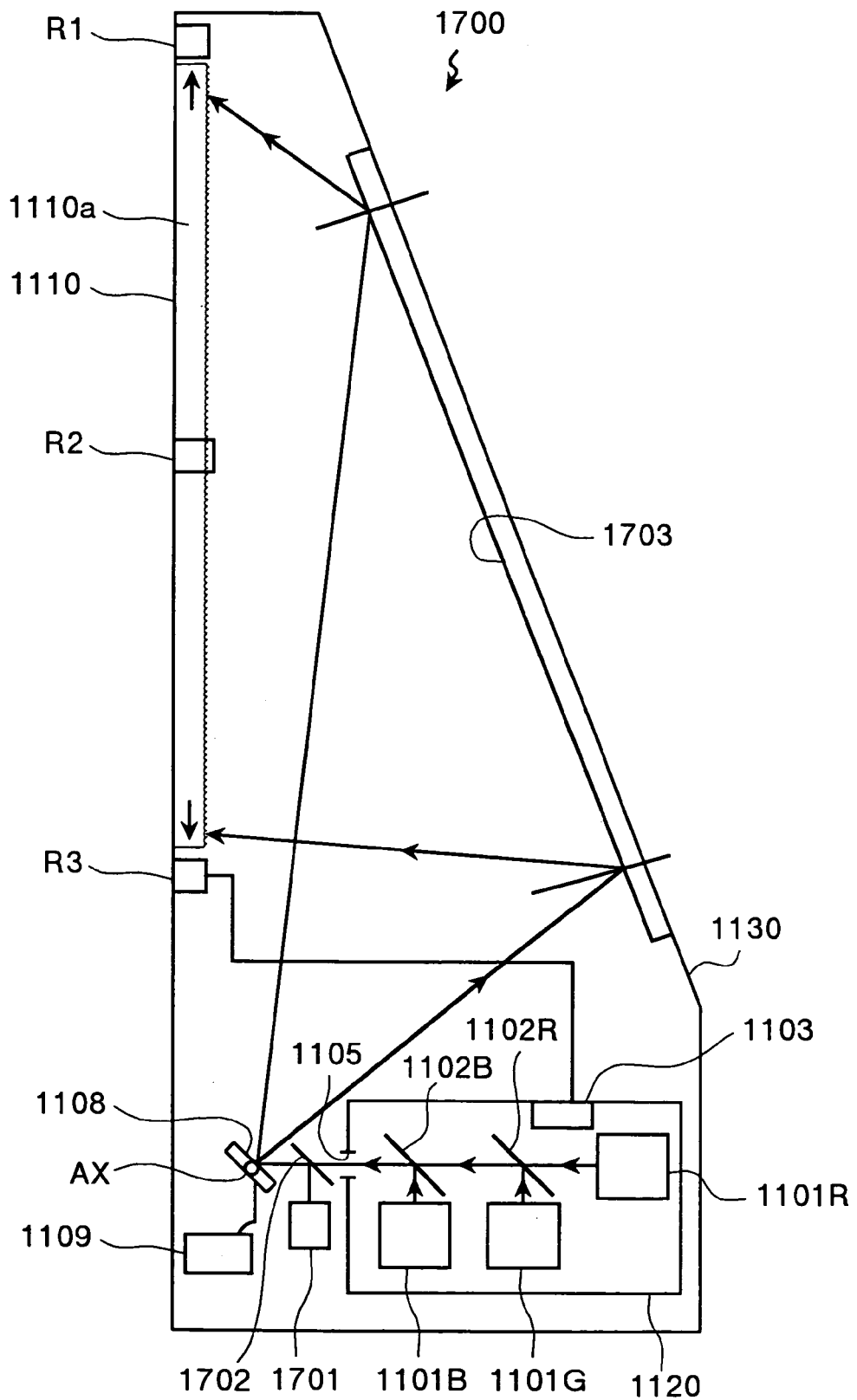
FIG. 17 is a drawing of a schematic structure of a projector according to a fifth embodiment of the present invention.

A schematic structure of a projector 1700 according to a fifth embodiment of the present invention is shown in FIG. 17. The same numerals are used for the same units as those of the third embodiment and the overlaps of their explanations are avoided. In the third embodiment, the galvano-mirror 1108 reflects each color laser beam and the like to the screen 1110. On the other hand, the galvano-mirror 1108 guides each color laser beam to the screen 1110 via a reflecting mirror 1703 in the present embodiment.

The reflecting mirror 1703 reflects the beam light reflected from the galvano-mirror 1108 that serves as a scanning unit. The screen 1110 is arranged opposite to the reflecting mirror 1703. The beam light reflected from the reflecting mirror 1703 is projected to the screen 1110. The projector 1700 can be reduced in size by projecting each color beam light to the screen 1110 via the reflecting mirror 1703.

A light source for monitoring of reflecting mirror 1701 to emit the infrared rays that are invisible light is provided between the laser unit 1120 and the galvano-mirror 1108. The light path of the infrared rays from the light source for monitoring of reflecting mirror 1701 is distorted by 90 degrees by a dichroic mirror 1702. The dichroic mirror 1702 allows penetration of the each color laser beam and reflects the infrared rays from the laser unit 1120. Each color laser beam and the infrared rays for image forming are scanned in the two-dimensional direction and reflected to the direction of the reflecting mirror 1703 by the galvano-mirror 1108.

Each color laser beam and the infrared rays reflected from the reflecting mirror 1703 enter the screen 1110. The screen 1110 is constituted of a member such as glass or transparent plastic that can propagate infrared rays. The infrared rays are refracted by the screen 1110 and penetrate to the side of an observer. At this time, part of the infrared rays does not penetrate through the screen 1110 but propagates inside the screen 1110. The infrared rays to propagate inside the screen 1110 are received by light receiving units for monitoring of reflecting mirror R1, R2, and R3.

When something abnormal occurs with the reflecting mirror 1703, its reflectance is lowered. Here, something abnormal of the reflecting mirror 1703 means damage, burning, pinhole or the like of the reflecting mirror 1703. When something abnormal occurs with the reflecting mirror 1703, the intensity of the infrared rays to propagate inside the screen 1110 is also lowered. At this time, the intensities of the infrared rays received by the light receiving units for monitoring of reflecting mirror R1, R2, and R3 become lower than the predetermined intensity. Thus, detecting the infrared rays propagating inside the screen 1110 makes it possible to monitor the reflecting mirror 1703. The controller 1103 that also serves as a function of a beam light supply stopping unit stops supplying each color laser beam when the intensities of the infrared rays received by the light receiving units for monitoring of reflecting mirror R1, R2 and R3 are lower than the predetermined intensity. This allows a reduction in the possibility of exposure to the laser beam.

Figure 18:
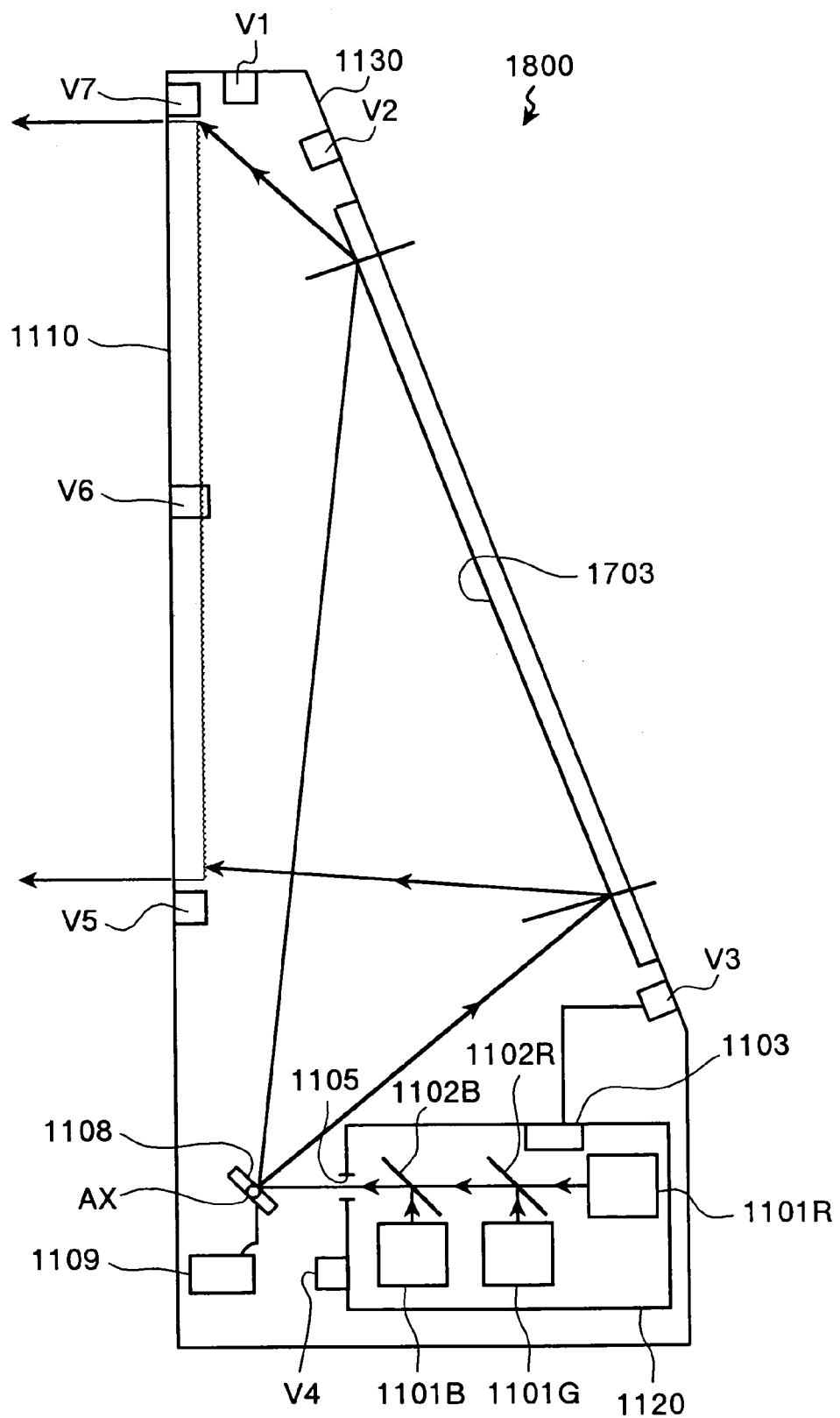
FIG. 18 is a drawing of a schematic structure of a projector according to a sixth embodiment of the present invention.
Figure 19:
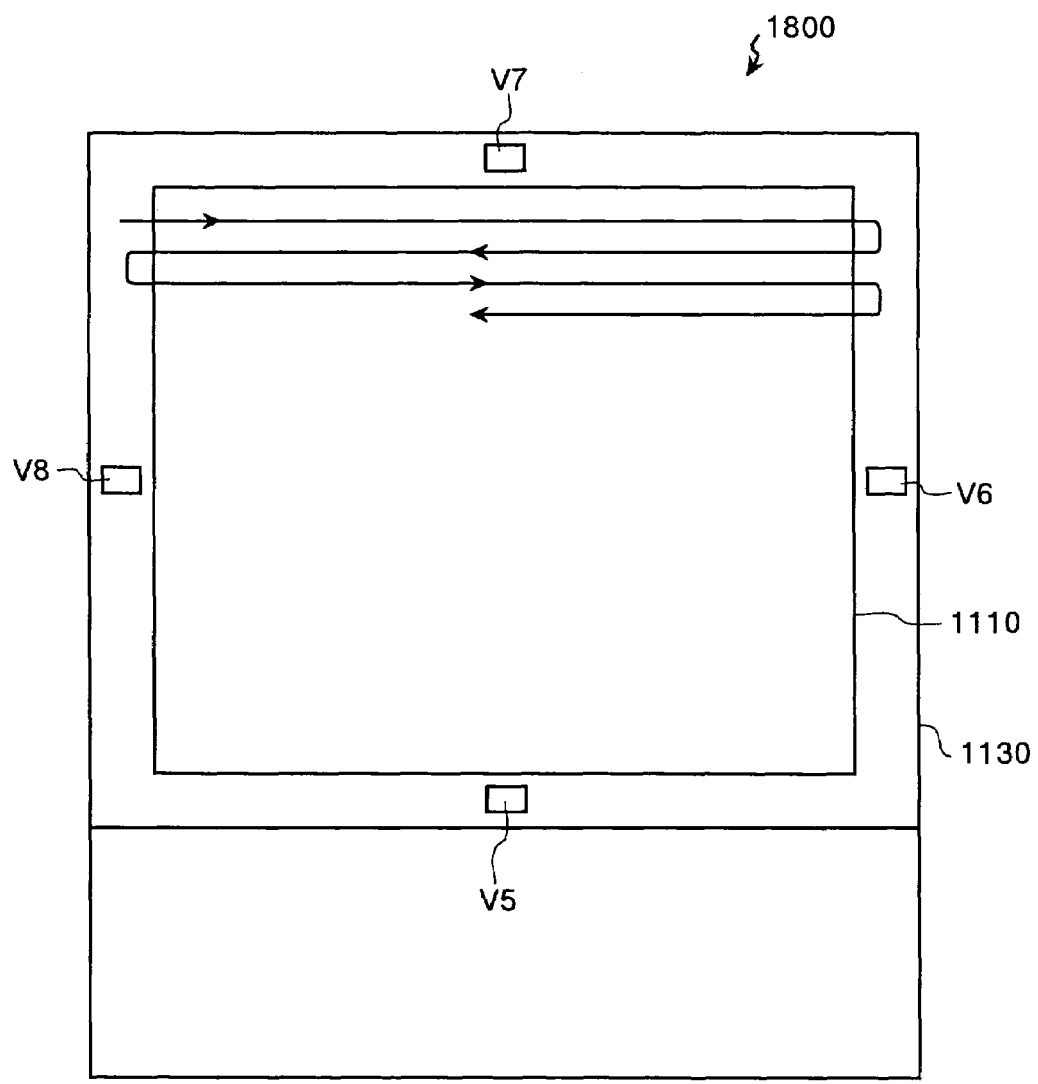
FIG. 19 is a front view for explaining a laser projector according to the sixth embodiment.

A schematic structure of a projector 1800 according to a sixth embodiment of the present invention is shown in FIG. 18. The same numerals are used for the same units as those of the third embodiment and the overlaps of their explanations are avoided. The cabinet 1130 houses at least the laser beam sources 1101R, 1101G, 1101B, the galvano-mirror 1108, and the screen 1110. On the inner wall surface of the cabinet 1130, a plurality of vibration sensors V1, V2, V3, V4, V5, V6, V7, and V8 are provided. Among a plurality of the vibration sensors V1 to V8, the arrangements of the vibration sensors V5 to V8 that are provided near the outer periphery of the screen 1110 are shown in FIG. 19. The controller 1103 that also serves as a function of a beam light supply stopping unit stops supplying each color beam light from the laser beam sources 1101R, 1101G, and 1101B according to the outputs of the vibration sensors V1 to V8.

For example, cases in which the main body of the projector 1800 is damaged intentionally, and the main body of the projector 1800 is damaged by an earthquake or the like are taken into consideration. In these cases, there is a risk that each color laser beam is directly emitted out of the cabinet 1130. When the main body of the projector 1800 is damaged intentionally, or when the main body of the projector 1800 is damaged by an earthquake or the like, the cabinet 1130 of the main body of the projector 1800 vibrates at amplitude that is higher than the predetermined amplitude of vibration. Therefore, when the vibration sensors V1 to V8 detect vibration of the cabinet 1130 higher than the predetermined amplitude, the supply of each color laser beam is stopped. This allows a reduction in the possibility of exposure to the laser beam.

Figure 20:
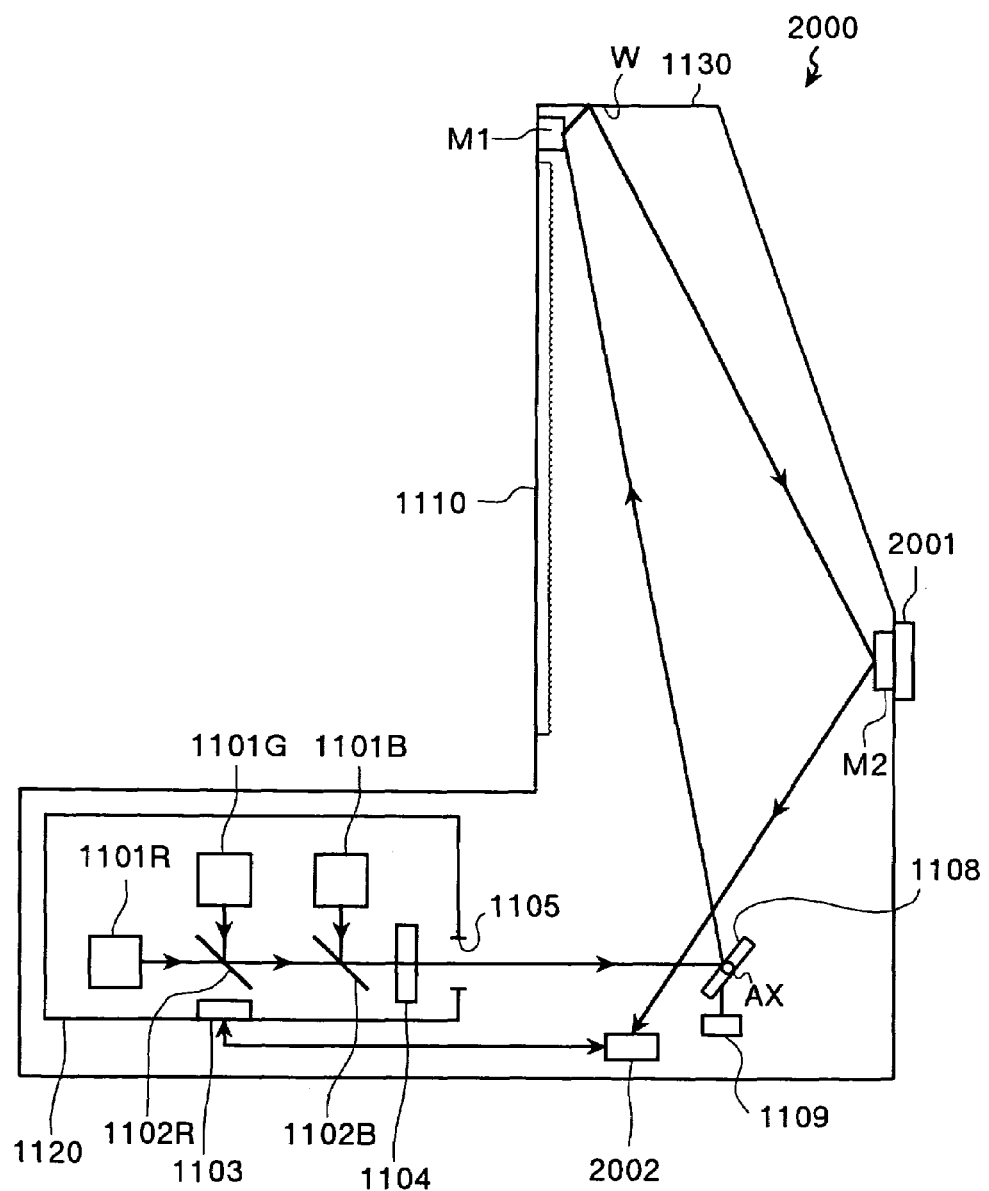
FIG. 20 is a drawing of a schematic structure of a projector according to a seventh embodiment of the present invention.

A schematic structure of a projector 2000 according to a seventh embodiment of the present invention is shown in FIG. 20. The same numerals are used for the same units as those of the third embodiment and the overlaps of their explanations are avoided. In the present embodiment, the inner wall surface of the cabinet 1130 is provided with a plurality of reflecting mirrors M1 and M2. A light receiving unit for cabinet monitoring 2002 receives at least the light reflected from the reflecting mirrors M1 and M2. In the present embodiment, the degree of optical sealing of the cabinet 1130 is monitored with the use of each color laser beam for image forming without providing a light source to supply infrared rays.

The cabinet 1130 of the projector 2000 is configured in a optically closed structure so that the laser beam is prevented from being emitted to the outside from parts other than the screen 1110. An opening 2001 for maintenance such as adjustment and repair of the inside structural elements such as the galvano-mirror 1108 may be provided. When each of the color laser beam sources 1101R, 1101G, and 1101B is oscillated when the opening 2001 for maintenance is open, each color laser beam is emitted out of the opening 2001 to the outside of the cabinet 1130.

In the present embodiment, a plurality of reflecting mirrors M1 and M2 are provided on the inner side surface of the cabinet at the opening 2001 for maintenance or predetermined inner wall surfaces of the cabinet. The galvano-mirror 1108 is driven so as to reflect the laser beam toward the positions of the reflecting mirrors M1 and M2 when the power is on, at the regular time, or at any given time. The light receiving unit for cabinet monitoring 2002 is arranged at the position that the light reflected from all reflecting mirrors M1 and M2 enters. Therefore, when the opening 2001 for maintenance or the like is open, the light receiving unit for cabinet monitoring 2002 does not receive the laser beam. As the result, it is possible to detect whether the cabinet 1130 is optically sealed. When the cabinet 1130 is not optically sealed, the controller 1103 that also serves as a function of a laser beam supply stopping unit stops supplying the laser beam. This leads to a reduction in the possibility of exposure to the laser beam.

In the present embodiment, when the intensity of each color laser beam received by the light receiving unit for cabinet monitoring 2002 is lower than the predetermined value, the controller 1103 stops supplying each color laser beam. When the opening 2001 for maintenance is open as described above, the light receiving unit for cabinet monitoring 2002 does not receive each color laser beam. Furthermore, when something abnormal such as damage or pinhole occurs with an inner wall surface W of the cabinet, there is a risk that the laser beam is emitted to the outside from the portion abnormal on the inner wall surface W of the cabinet.

In this case, the laser beam is reflected from a plurality of the reflecting mirrors M1 and M2 as well as the predetermined portion of the inner wall surface W of the cabinet, and received by the light receiving unit for cabinet monitoring 2002. When the intensity of the laser beam received by the light receiving unit for cabinet monitoring 2002 is lower than the predetermine value, it is possible to detect that, for example, the opening 2001 for maintenance is open or something abnormal is occurring on the inner wall surface W of the cabinet. This leads to a reduction in the possibility of exposure to the laser beam.

Figure 21:
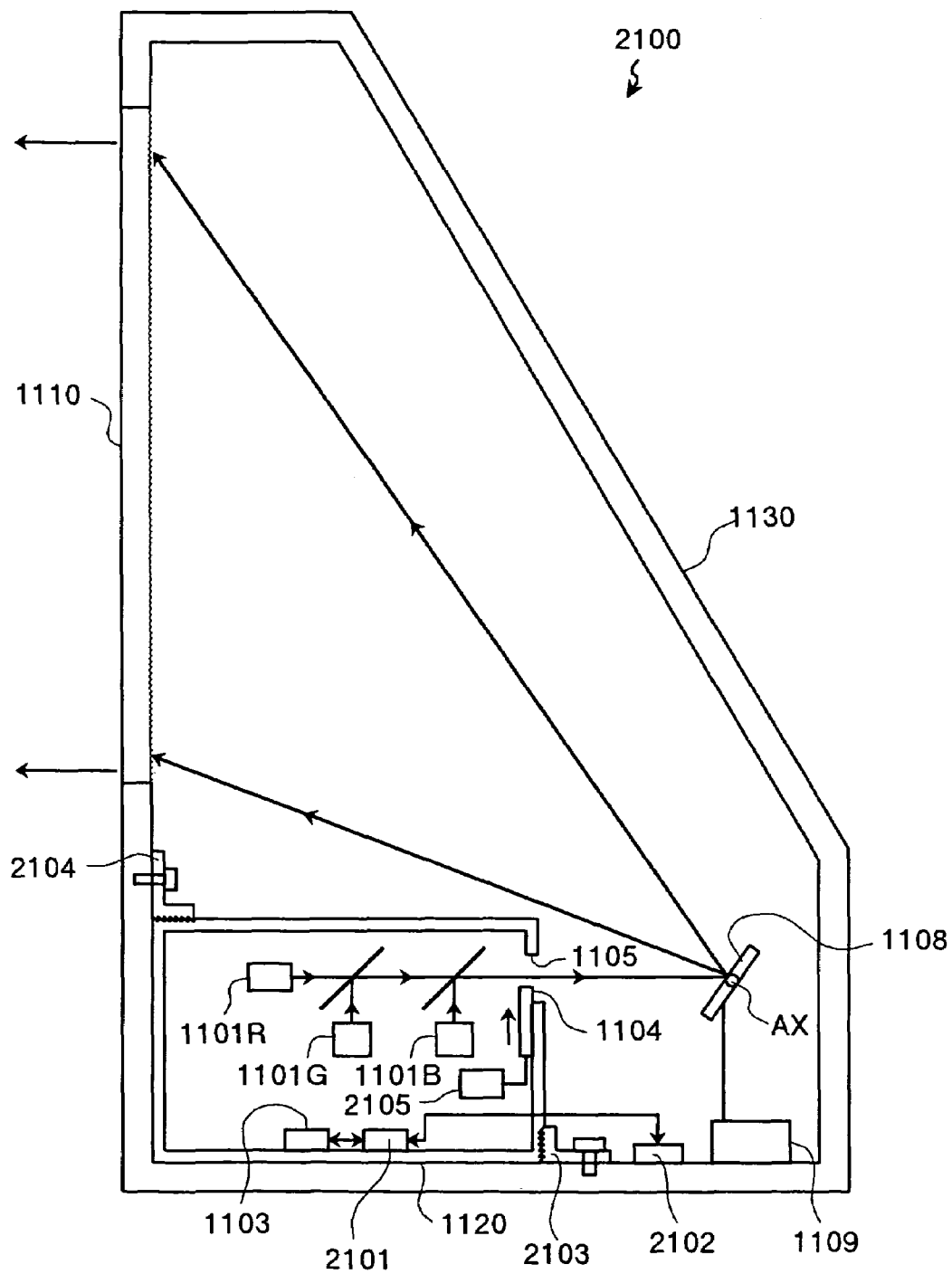
FIG. 21 is a drawing of a schematic structure of a projector according to an eighth embodiment of the present invention.

A schematic structure of a projector 2100 according to eighth embodiment of the present invention is shown in FIG. 21. The same numerals are used for the same units as those of the third embodiment and the overlaps of their explanations are avoided. Each of the laser beam sources 1101R, 1101G and 1101B is housed in the laser unit 1120. The opening 1105 of the laser unit 1120 is provided with the shutter 1104. The laser unit 1120 is fixed to the cabinet 1130 with fixing units 2103 and 2104. Each of the fixing units 2103 and 2104 has lock mechanism with a key. By providing the lock mechanism, it can be prevented to take the laser unit 1120 out of the cabinet 1103 with ease. The controller 1103 that also serves as a function of a laser beam supply stopping unit stops supplying the laser beam when the cabinet 1130 and the laser unit 1120 are separated from each other. The controller 1130 has a shutter driving unit 2105. The shutter driving unit 2105 closes the shutter 1104 irreversibly when the cabinet 1130 and the laser unit 1120 are separated from each other. Closing the shutter 1104 irreversibly means that the shutter 1104 cannot be opened again once it is closed.

A case in which the laser unit 1120 inside the projector 2100 is intentionally taken out of the main body of the projector 2100 and each of the color laser beam sources 1101R, 1101G, and 1101B is diverted to other applications may also be thought about. The possibility of exposure to the laser beam exists in this case as well. In the present example, the laser unit 1120 housing each of the color laser beam sources 1101R, 1101G, and 1101B, and the cabinet 1130 are fixed to each other by the fixing units 2103 and 2104. When the cabinet 1130 and the laser unit 1120 are separated from each other, that is, when the laser unit 1120 is taken out of the cabinet 1130, the supply of the laser beam is stopped. This allows a reduction in the possibilities of diversion of the laser beam sources 1101R, 1101G, and 1101B to other applications, and of exposure to the laser beam. In particular, the present embodiment allows stopping the supply of the laser beam by closing the shutter 1104 irreversibly. Owing to this, the shutter 1104 can shield the laser beam even when the laser beam keeps being oscillated.

Figure 22:
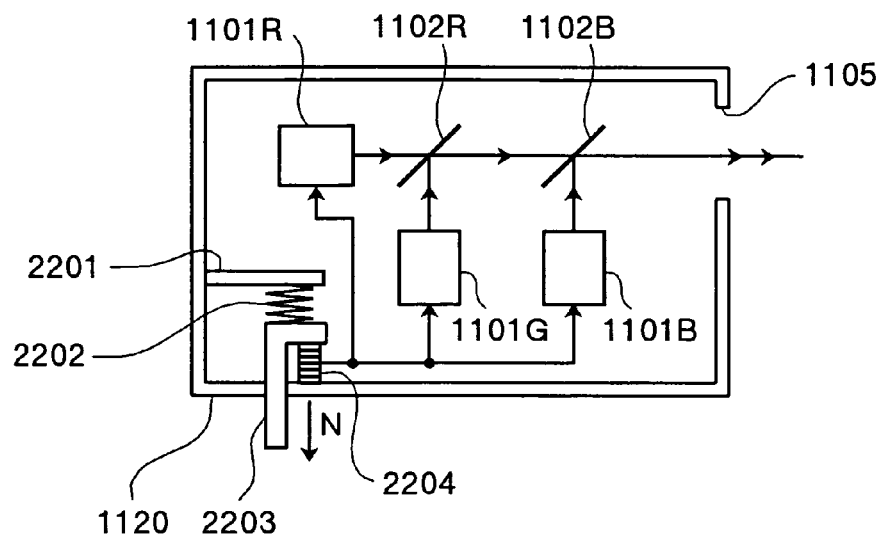
FIG. 22 is a drawing of a schematic structure of a modification of the eighth embodiment.

More preferably, the laser beam supply stopping unit desirably makes each of the laser beam sources 1101R, 1101G, and 1101B unable to oscillate in an irreversible way when the cabinet 1130 and the laser unit 1120 are separated from each other. A structure in which the laser beam sources 1101R, 1101G, and 1101B are made unable to oscillate is shown in FIG. 22. An abutment unit 2201 is fixed to the laser unit 1120. A protruding unit in an L-shape 2203 is biased by an elastic unit 2202 such as a spring in the direction shown with an arrow N by respect to the abutment unit 2201. A piezoelectric element 2204 is provided between an end of the protruding unit 2203 and the laser unit 1120. When the laser unit 1120 is fixed to the cabinet 1130, the protruding unit 2203 is pushed upward in FIG. 22 against the bias force. On the other hand, when the laser unit 1120 is separated from the cabinet 1130, the protruding unit 2203 is pushed downward in FIG. 22 according to the bias force of the elastic member 2202, thereby thrusting the piezoelectric element 2204 with the end of the protruding unit 2203. As the piezoelectric element 2204, a known piezo element, for example, can be used. The piezoelectric element 2204 generates high voltage by adding a force in the compression direction by the protruding unit 2203. Semiconductor lasers are taken into consideration as the laser beam sources 1101R, 1101G and 1101B. These laser beam sources can be destroyed so as to become unable to oscillate by applying voltage much higher than the predetermined value with respect to the semiconductor lasers. The value of voltage generated by the piezoelectric element 2204 is the value required for destroying the semiconductor lasers. This does not allow the laser beam to oscillate even if the laser unit 1120 is reinstalled in the cabinet 1130. As the result, the possibilities that the laser unit 1120 is diverted to other applications and that exposure to the laser beam can be reliably reduced.

In the present embodiment, the laser unit 1120 further has a first circuit substrate 2101 that has first recognition data. A second circuit substrate 2102 that has second recognition data is provided outside of the laser unit 1120 in the cabinet 1130. The controller 1103 desirably drives each of the color laser beam sources 1101R, 1101G, and 1101B only when the first recognition data and the second recognition data are the same. Therefore, the laser beam sources 1101R, 1101G, and 1101B do not oscillate unless the predetermined recognition numbers of the laser unit 1120 and the cabinet 1130 are combined. As the result, the laser unit 1120 cannot be oscillated independently. Furthermore, the laser unit 1120 cannot be oscillated even if it is installed in another appropriate cabinet. This leads to a further reliable reduction in the possibility of exposure to the laser beam.

Figure 23A:
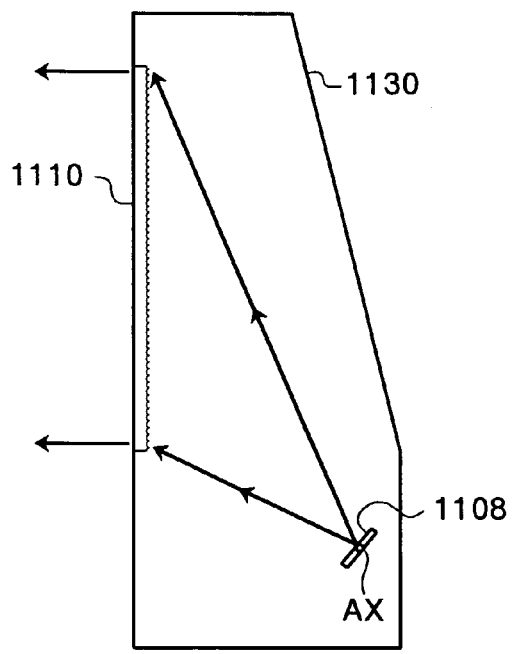
FIG. 23A is a drawing for explaining a rear-type projector.
Figure 23B:
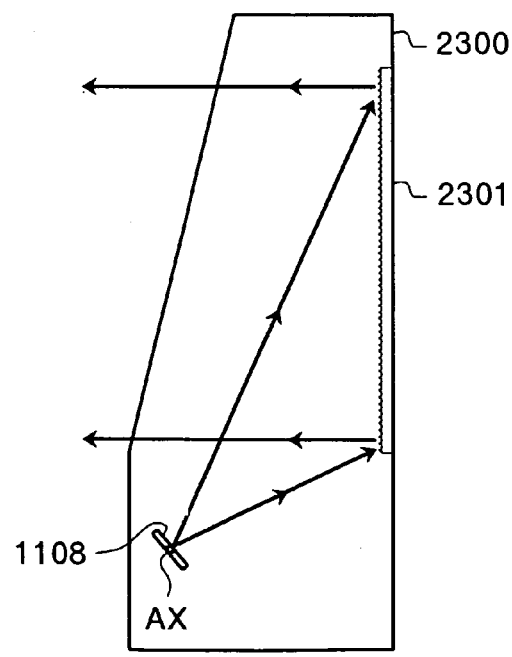
FIG. 23B is a drawing for explaining a projector with the use of a reflection-type screen.

The above embodiments are explained with the use of the rear-type projector as shown in FIG. 23A. However, the laser unit is not limited to the above but can be applied to a projector 2300 with a reflection-type screen 2301 as shown in FIG. 23B. Moreover, infrared rays are used as invisible light in the above embodiments. However, the invisible light is not limited to infrared rays but any light may be accepted as long as it supplies light having wave lengths in invisible region. The embodiments of a laser projector as a projector for which laser beam is used has been explained, but a projector that uses laser diodes as the light sources may be employed. The projectors according to each embodiment described above are configured so as to scan beam light but the present invention can be applied to a projector configured so as to scan a screen with beams in a line form.

INDUSTRIAL APPLICABILITY

The projector relating to the present invention is useful when performing presentations or displaying moving pictures.

The invention claimed is:

1. A rear-type projector comprising:
   a laser beam source that outputs a laser beam that is modulated based on an image signal from an opening:
   a scanning unit that scans the laser beam within a predetermined surface;
   a screen to which the laser beam is projected from a backside of the screen;
   a light source unit for screen monitoring that is disposed outside the opening and that emits invisible light for monitoring the screen;
   a screen monitoring unit that receives the invisible light reflected from the screen;
   a control unit that controls the laser beam source so as to stop output of only the laser beam based on an output of the screen monitoring unit; and
   a housing that covers an optical path from the laser beam source to the backside of the screen.

2. The projector according to claim 1, wherein the screen monitoring unit includes
   a light receiving unit that receives invisible light reflected from the screen.

3. The projector according to claim 2, further comprising a filter that allows the invisible light to pass through and absorbs or reflects the laser beam that is arranged in a light path between the screen and the light receiving unit, wherein
   the light receiving unit receives the invisible light reflected from the screen, and the control unit controls the laser beam source so as to stop output of the laser beam when an intensity of the invisible light received by the light receiving unit is lower than a predetermined value.

4. The projector according to claim 2, wherein the light source unit emits the invisible light as modulated light that has a predetermined pulse train; the light receiving unit for screen monitoring receives the invisible light that has the pulse train; and the control unit controls the laser beam source so as to stop output of the laser beam when the pulse train of the invisible light to be received by the light receiving unit for screen monitoring is not detected.

5. The projector according to claim 2, wherein the screen monitoring unit includes a beam light receiving unit that receives the light reflected from the screen or the light propagated inside the screen from among the beam lights projected to the screen, the control unit controls the laser beam source so as to stop output of the laser beam when a correlation value between the beam light projected to the screen and the light reflected from the screen, or a correlation value between the beam light projected to the screen and the light propagated inside the screen is smaller than a predetermined value.

6. A rear-type projector comprising:

- a laser beam source that outputs a laser beam that is modulated based on an image signal;
- a scanning unit that scans the laser beam within a predetermined surface;
- a screen to which the laser beam is projected from a back side of the screen;
- a light source unit for screen monitoring that emits invisible light for monitoring the screen;
- a screen monitoring unit that receives the invisible light reflected from the screen, and includes a light source that emits invisible light and a light receiving unit that receives invisible light reflected from the screen;
- a control unit that controls the laser beam source so as to stop output of the laser beam based on an output of the screen monitoring unit;
- a filter that allows the invisible light to pass through and absorbs or reflects the laser beam that is arranged in a light path between the screen and the light receiving unit; and
- a housing that covers an optical path from the laser beam source to the backside of the screen, wherein:
  - the control unit controls the laser beam source so as to stop output of the laser beam when an intensity of the invisible light received the by light receiving unit is lower than a predetermined value.

* * * * *